(12) United States Patent
Kitagawa et al.

(10) Patent No.: US 8,536,806 B2
(45) Date of Patent: Sep. 17, 2013

(54) SEMICONDUCTOR INTEGRATED CIRCUIT AND OPERATION METHOD THEREOF

(75) Inventors: Yuhei Kitagawa, Kanagawa (JP); Kazuyasu Minami, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 134 days.

(21) Appl. No.: 13/290,229

(22) Filed: Nov. 7, 2011

(65) Prior Publication Data

US 2012/0133291 A1 May 31, 2012

(30) Foreign Application Priority Data

Nov. 26, 2010 (JP) ................. 2010-263226

(51) Int. Cl.
 *G05F 1/00* (2006.01)
 *H05B 37/02* (2006.01)
 *H05B 39/04* (2006.01)
 *H05B 41/36* (2006.01)

(52) U.S. Cl.
 USPC .................... 315/308; 315/186; 315/192

(58) Field of Classification Search
 None
 See application file for complete search history.

(56) References Cited

U.S. PATENT DOCUMENTS

| | | | |
|---|---|---|---|
| 2004/0208011 A1 | 10/2004 | Horiuchi et al. | |
| 2009/0121644 A1* | 5/2009 | Sandner et al. | 315/241 P |
| 2010/0201278 A1* | 8/2010 | Zhao | 315/185 R |
| 2011/0031898 A1* | 2/2011 | Lin et al. | 315/297 |
| 2011/0267375 A1* | 11/2011 | Yang et al. | 345/690 |
| 2012/0306399 A1* | 12/2012 | Bazzani et al. | 315/210 |
| 2013/0033196 A1* | 2/2013 | Tsuchida et al. | 315/297 |

FOREIGN PATENT DOCUMENTS

JP  2003-332624 A  11/2003

OTHER PUBLICATIONS

Product Name: MAX17061 Data Sheet, MAXIM 8 String White LED Driver with SMBus for LED Panel Applications, pp. 1-26, 2008. Maxim Integrated Products, http://www.maxim-ic.com/datasheet/index.mvp/id/5445 [Retrieved on Oct. 15, 2010 (22nd year of the Heisei Era)].

* cited by examiner

*Primary Examiner* — Jany Richardson
(74) *Attorney, Agent, or Firm* — Mattingly & Malur, PC

(57) ABSTRACT

A DC-DC converter supplies an output voltage to a plurality of channels of a light emitting device array in common. A current driver has a plurality of driver units which drive the channels. Each of the driver units includes a drive transistor and a detector which detects an abnormality of a drive current. A logic unit generates digital data in response to a plurality of detection signals and supplies the same to a D/A converter. An analog reference voltage of the D/A converter is supplied to the DC-DC converter. The logic unit executes a calibration operation which determines digital data for setting the minimum output DC voltage at the normal operation of all the channels by sequential updating of the digital data.

20 Claims, 8 Drawing Sheets

SEMICONDUCTOR INTEGRATED CIRCUIT AND OPERATION METHOD THEREOF

CROSS-REFERENCE TO RELATED APPLICATIONS

The present application claims priority from Japanese patent application JP 2010-263226 filed on Nov. 26, 2010, the content of which is hereby incorporated by reference into this application.

BACKGROUND

The present invention relates to a semiconductor integrated circuit for controlling and driving light emitting devices and an operation method thereof, and particularly to a technology effective in generating the optimum drive voltage even with respect to fluctuations in temperature and variations in the characteristics of light emitting devices, etc, and reducing power consumption of a system.

A light emitting diode (LED) is a semiconductor device which applies a voltage in its forward direction to thereby emit light. The principle of light emission or luminescence thereof utilizes an electro-luminescence (EL) effect. Organic EL (OLEDs: Organic light-emitting diodes) are also included in light emitting diodes.

The light emitting diode utilizes a PN junction structure of a semiconductor. The luminescence aims to directly convert energy held in electrons into light energy and requires no intervention of heat and kinetic energy. With the voltage applied in the forward direction, electrons and positive holes respectively flow into a conduction band and a valence band and are recombined beyond a band gap in the neighborhood of a PN junction portion. Upon their recombination, energy equivalent to an approximately forbidden bandwidth is emitted as photons or light. The wavelength of emitted light is determined by the bandgap of a semiconductor material and basically takes the form of single-color luminescence. Light emitting diodes of various neutral colors such as a white color, incandescent, etc. have also been produced by applying fluorescent coating onto the surfaces of the light emitting diodes that emit blue, purple and ultraviolet rays.

For the luminescence of each light emitting diode, it is necessary to apply a supply voltage greater than a forward voltage $V_F$ for a PN junction between its anode and cathode. The amount of light emitted by the light emitting diode depends on the forward amount of current. The forward voltage $V_F$ of the light emitting diode varies according to the luminescent color. The forward voltage $V_F$ is 1.4V or so at infrared light. The forward voltage $V_F$ is 2.1V or so at the red, orange, yellow and green colors. The forward voltage $V_F$ is 3.5V or so at the white and blue colors. The forward voltage $V_F$ ranges from about 4.5V to about 6V at the ultraviolet rays.

Light emitting diodes having various luminescent colors can be manufactured by using the following semiconductor materials in association with the luminescent colors of the light emitting diodes.

Aluminum gallium arsenide (AlGaAs)—infrared·red

Gallium arsenide phosphide (GaAsP)—red·orange·yellow

Indium gallium nitride (InGaN)/Gallium nitride (GaN)/Aluminum gallium nitride (AlGaN)—(orange·yellow·) green·blue·purple·ultraviolet Gallium phosphide (GaP)—red·yellow·green Zinc selenide (ZnSe)—green·blue Aluminum indium gallium phosphide (AlGaInP)—orange·golden yellow·yellow·green On the other hand, the white light is light achieved by a continuous spectrum throughout the visible rays, whereas the light emitting diode emits only wavelengths in a specific range. For this reason, a white light emitting diode cannot be materialized in the original sense. There has, however, been proposed a pseudo-white light emitting diode using the nature of human eyes. This light emitting diode utilizes the property that a mixture of three primary colors and a mixture of two colors placed in a complementary-color relationship are also visible to the human eyes as the white color. This is used as a substitute for the white light.

For example, a fluorescent-material type white light emitting diode has a structure in which a chip for a light emitting diode is coated with a luminescent material in the form of a system in which a blue light emitting diode or a light emitting diode having a wavelength shorter than it and a fluorescent material are combined together. When it is lit up, a mixture of light by fluorescence and light of the light emitting diode, which has penetrated through the luminescent material, is obtained. Thus, the white light can be obtained by adjusting a fluorescence wavelength, the thickness of the fluorescent material, etc.

A blue/yellow-system pseudo white light emitting diode is a mainstream of the current white light emitting diode. A white light emitting diode that is very light in visual form is achieved by combining a fluorescent material fluorescent to the yellow having a wavelength high in visibility, and a blue light emitting diode.

Since the light emitting diode (LED) is low in power consumption, long-lived and small in size, it has been used in a vast number of electronic equipment. As concrete applications, the light emitting diode is applied to a traffic light, directional signs at traffic-related stations/airports, a large-sized vision, an advertising display or the like, backlights for a liquid crystal television and a notebook personal computer, an LED display, LED illumination for interior/outdoor lighting, etc. An expansion of its application range is moving ahead.

A driver for driving an LED array of white light emitting diodes, which is used as a backlight source for a large-sized liquid-crystal display, has recently been made in public from each of semiconductor makers. This driver is capable of driving in parallel, a plurality of LED strings. At each of the strings, a plurality of light emitting diodes (LEDs) can be coupled in series.

The following patent document 1 has described that in a light emitting device driving device capable of driving a plurality of light emitting device strings including a plurality of light emitting devices therein, constant current driving is performed regardless of variations in the characteristics of the light emitting devices to reduce power losses. A high voltage generated from a step-up switching power supply circuit is supplied to a plurality of anodes of the top-stage light emitting devices included in the light emitting device strings in common. A plurality of cathodes of the bottom-stage light emitting devices included in the light emitting device strings are respectively driven by a plurality of constant current drivers. Further, a plurality of voltages of the cathodes of the bottom-stage light emitting devices, i.e., a plurality of voltages applied to the constant current drivers are supplied to a selection circuit. The selection circuit selects the minimum voltage from the voltages and feeds it back to a control circuit as a detection voltage. Since the control circuit generates a control signal in such a manner that the detection voltage becomes equal to a reference voltage, the step-up switching power supply circuit controls the magnitude of a high voltage in response to the control signal, so that the detection voltage becomes equal to the reference voltage. The value of the reference voltage is set in such a manner that each of transistors of the constant current drivers is operated in an active region having a margin slightly more than the boundary between the active region and a saturated region to allow a constant current to flow through the transistor with reliability. As a result, since the high voltage of the step-up switching power supply circuit is automatically controlled in such a manner that the minimum voltage becomes equal to the reference voltage, it is possible to sufficiently emit light from each LED device and reduce losses of the constant current drivers, even though variations in the characteristics of the LED devices take place.

The following non-patent document 1 has described a high-efficiency driver having white light emitting diodes designed for a large-sized liquid crystal display with a LED array of the white light emitting diodes as a light source. The LED array is capable of configuring in parallel up to 8 strings having 10 series-coupled LEDs per string. An output voltage generated from a step-up controller comprised of an inductor, a power MOS transistor, a rectifying diode and a capacitor is supplied to a plurality of anodes of the top-stage LEDs of the eight strings in common. A plurality of cathodes of the bottom-stage LEDs of the eight strings are respectively driven by a plurality of current sources. Each of the current sources is comprised of a differential amplifier, an N channel MOS transistor and a resistor. The step-up controller automatically selects the minimum voltage of a plurality of feedback voltages corresponding to drive voltages of the current sources to thereby adjust an output voltage.

PRIOR ART DOCUMENTS

Patent Documents

[Patent Document 1] Japanese Patent Laid-Open No. 2003-332624
[Non-Patent Document 1] Product Name MAX17061 Data Sheet "MAXIM 8-String White LED Driver with SMBus for LED Panel Applications" pp. 1-26, (C) 2008 Maxim Integrated Products http://www.maxim-ic.com/datasheet/index.mvp/id/5445 [Retrieved on Oct. 15, 2010 (22nd year of the Heisei Era)]

SUMMARY

Prior to the present invention, the present inventors, et al. have been involved in the development of a semiconductor integrated circuit for controlling and driving a white LED array capable of being used as a backlight source for a large-sized liquid crystal display used in a television receiver or the like.

FIG. 1 is a diagram showing a configuration of a semiconductor integrated circuit for controlling and driving a white LED array studied by the present inventors, et al. prior to the present invention.

The semiconductor integrated circuit 1 shown in FIG. 1 is comprised of a step-up DC-DC converter 10, a constant current driver 20 having eight channels (eight strings), a logic unit 30 and a reference voltage generator 40. The logic unit 30 includes a 12-bit (4096-gradation) dimming controller 31.

As shown in FIG. 1, the semiconductor integrated circuit 1 is supplied with an input DC voltage $V_{IN}$ having a voltage range from 10V to 26.0V, for example. Further, an inductor 2, an N channel power MOS transistor 3, a rectifying diode 4 that is a schottky diode, for example, a smoothing capacitor 5 and a feedback circuit 6 are couplable to the semiconductor integrated circuit 1. The input DC voltage $V_{IN}$ is coupled to one end of the inductor 2. The other end of the inductor 2 is coupled to a drain terminal of the power MOS transistor 3 and an anode of the rectifying diode 4. A cathode of the rectifying diode 4 is coupled to the feedback circuit 6, the smoothing capacitor 5 and a plurality of anodes of top-stage LED devices D11 through D81 of the eight channels. A plurality of cathodes of bottom-stage LED devices D16 through D86 of the eight channels are coupled to their corresponding output terminals OUT1 through OUT8 of driver units 21 through 28 of eight channels lying inside the constant current driver 20. Constant current setting resistors Rs are respectively coupled between constant current setting terminals SO1 through SO8 of the driver units 21 through 28 of the eight channels in the constant current driver 20 and a ground potential.

The driver unit 21 of the constant current driver 20 is comprised of a differential amplifier 211 and an N channel MOS transistor 212. A non-inversion input terminal of the differential amplifier 211 is supplied with a reference voltage Vref. An output terminal of the differential amplifier 211 is coupled to a gate terminal of the N channel MOS transistor 212. A source terminal of the N channel MOS transistor 212 is coupled to an inversion input terminal of the differential amplifier 211 and one end of the constant current setting resistor Rs. The other end of the constant current setting resistor Rs is coupled to the ground potential. A drain terminal of the N channel MOS transistor 212 is coupled to the cathode of the bottom-stage LED device D16 of the first channel through the output terminal OUT1 of the driver unit 21.

The differential amplifier 211 and the N channel MOS transistor 212 of the driver unit 21 in the constant current driver 20 operate as a voltage follower. Therefore, both ends of the constant current setting resistor Rs are supplied with the reference voltage Vref so that the value of a first channel LED drive current $I_{LED<1>}$ that flows into the LED devices D11 through D16 of the first channel is set. The driver units 21 (not shown) through 28 of other channels in the constant current driver 20 are respectively comprised of differential amplifiers and N channel MOS transistors for the voltage follower operation exactly in the same manner as the driver unit 21. The values of other second channel LED drive current $I_{LED<2>}$ (not shown) through eighth channel LED drive current $I_{LED<8>}$ are set.

Further, the voltages of the cathodes of the bottom-stage LED devices D16 through D86 for the eight channels, i.e., a plurality of drive output voltages of the output terminals OUT1 through OUT8 of the driver units 21 through 28 in the constant current driver 20 are respectively supplied to a plurality of inversion input terminals of an error amplifier 11 of the step-up DC-DC converter 10.

The dimming controller 31 of the logic unit 30 is supplied with 1-bit serial dimming control data in sync with a dimming clock DPWMCLK. The dimming controller 31 supplies dimming pulse-width modulation scheme drive signals DPWMO<1> through <8> to the driver units 21 through 28 of the constant current driver 20 in response to the dimming control data. The dimming pulse-width modulation scheme drive signals DPWMO<1> through <8> enable dimming of the light emitting brightness of the LEDs according to the ratio between periods of high and low levels.

The reference voltage generator 40 supplies an addition voltage Vref+$V_{SAT}$ obtained by addition of offsets of the reference voltage Vref of the non-inversion input terminals of the differential amplifiers 211 of the driver units 21 through 28 of the constant current driver 20 and drain-to-source saturated voltages $V_{SAT}$ of the N channel MOS transistors 212 of the driver units 21 through 28 of the constant current driver 20 to a non-inversion input terminal of the error amplifier 11 of the step-up DC-DC converter 10 as a reference voltage $V_{REF}$.

The step-up DC-DC converter 10 is comprised of the error amplifier 11 and a controller 12. The non-inversion input terminal of the error amplifier 11 is supplied with the reference voltage $V_{REF}$ generated from the reference voltage generator 40. The inversion input terminals of the error amplifier 11 are supplied with the drive output voltages of the output terminals OUT1 through OUT8 of the driver units 21 through 28. The last inversion input terminal of the error amplifier 11 is supplied with a feedback voltage $V_{FB}$ generated from the feedback circuit 6. Incidentally, the feedback voltage $V_{FB}$ is generated by dividing a step-up output DC voltage $V_{OUT}$ generated from the cathode of the rectifying diode 4 by two division resistors R1 and R2 of the feedback circuit 6.

A switching regulator comprised of the step-up DC-DC converter 10, the inductor 2, the N channel power MOS transistor 3, the rectifying diode 4 and the smoothing capacitor 5 repeats an on period of the power MOS transistor 3 and an off period of thereof to thereby perform a pulse width modulation (PWM) operation for generating the step-up output DC voltage $V_{OUT}$ from the cathode of the rectifying diode 4.

Assuming that the inductance of the inductor 2 is L and the time is t, a current given by the following equation flows from the input DC voltage $V_{IN}$ to the ground potential through the inductor 2 and the power MOS transistor 3 during the on period of the power MOS transistor 3:

$$I_{ON} = V_{IN} \cdot t/L \quad (1)$$

During the off period of the power MOS transistor 3 after the on period thereof, a current given by the following equation flows from the input DC voltage $V_{IN}$ to the smoothing capacitor 5 through the inductor 2 and the rectifying diode 4:

$$I_{OFF} = (V_{IN} - V_{OUT}) \cdot t/L \quad (2)$$

Assuming that the on period of the power MOS transistor 3 is $T_{ON}$ and the off period of the power MOS transistor 3 is $T_{OFF}$, the current given by the equation (1) and the current given by the equation (2) should be made equal to each other at the boundary between both periods. Accordingly, the following equation is obtained:

$$V_{IN} \cdot T_{ON}/L = (V_{IN} - V_{OUT}) \cdot T_{OFF}/L \quad (3)$$

Expanding the equation (3) yields the relationship of the following equation:

$$V_{OUT} = (1 + (T_{ON}/T_{OFF})) \cdot V_{IN} \quad (4)$$

This equation (4) shows that the switching regulator comprised of the step-up DC-DC converter 10, the inductor 2, the N channel power MOS transistor 3, the rectifying diode 4 and the smoothing capacitor 5 generates an output DC voltage $V_{OUT}$ having a voltage larger than that of the input DC voltage $V_{IN}$.

On the other hand, the feedback voltage $V_{FB}$ obtained by division of the output DC voltage $V_{OUT}$ by the division resistors R1 and R2 of the feedback circuit 6 is supplied to the last inversion input terminal of the error amplifier 11, and the non-inversion input terminal of the error amplifier 11 is supplied with the reference voltage $V_{REF}$ generated from the reference voltage generator 40. For this reason, the error amplifier 11 is operated in such a manner that the level of the feedback voltage $V_{FB}$ coincides with the level of the reference voltage $V_{REF}$ to thereby generate an output DC voltage $V_{OUT}$. That is, the controller 12 determines the ratio between the on period $T_{ON}$ and the off period $T_{OFF}$ according to the ratio between a rising period of a pulse-width modulated (PWM) triangular waveform and a falling period thereof in such a manner that both voltage levels coincide with each other.

In a manner approximately similar to the description of the patent document 1 and the description of the non-patent document 1, the voltages of the cathodes of the bottom-stage LED devices D16 through D86 for the eight channels, i.e., the drive output voltages of the output terminals OUT1 through OUT8 of the driver units 21 through 28 of the constant current driver 20 are respectively supplied to the inversion input terminals of the error amplifier 11 of the step-up DC-DC converter 10. Thus, the error amplifier 11 selects the minimum voltage out of the drive output voltages. Further, since the error amplifier 11 controls the controller 12 in such a manner that the level of the selected minimum voltage becomes equal to the step-up reference voltage $V_{REF}$ (=Vref+$V_{SAT}$), the level of the output DC voltage $V_{OUT}$ is finally adjusted. Thus, the level of the output DC voltage $V_{OUT}$ is automatically controlled in such a manner that the minimum voltage of the drive output voltages becomes equal to the reference voltage $V_{REF}$ (=Vref+$V_{SAT}$). Therefore, even if variations in the characteristics of the LED devices D11 through D16, . . . , and D81 through D86 occur, it is possible to cause the LED devices to emit light sufficiently and reduce losses of the driver units 21 through 28 of the constant current driver 20.

In the semiconductor integrated circuit 1 for the white LED array shown in FIG. 1, the level of the minimum voltage selected by the error amplifier 11 increases where the forward voltages $V_F$ of PN junctions of the LED devices D11 through D16, . . . , and D81 through D86 are reduced due the causes of a rise in temperature, variations in the characteristics of the LED devices, etc. Thus, the error amplifier 11 and the controller 12 of the step-up DC-DC converter 10 reduce the level of the output DC voltage $V_{OUT}$ in such a manner that the level of the increased and selected minimum voltage is reduced to the reference voltage $V_{REF}$ (=Vref+$V_{SAT}$).

In the semiconductor integrated circuit 1 for the white LED array shown in FIG. 1, the level of the minimum voltage selected by the error amplifier 11 is reduced where the forward voltages $V_F$ of the PN junctions of the LED devices D11 through D16, . . . , and D81 through D86 increase due to the causes of a drop in temperature, variations in the characteristics of the LED devices, etc. Thus, the error amplifier 11 and the controller 12 of the step-up DC-DC converter 10 raise the level of the output DC voltage $V_{OUT}$ in such a manner that the level of the reduced and selected minimum voltage increases to the reference voltage $V_{REF}$ (=Vref+$V_{SAT}$). Since, however, the switching regulator of FIG. 1 has a limit to a rise in the output DC voltage $V_{OUT}$ it is not possible to raise the level of the output DC voltage $V_{OUT}$ beyond its limit.

Thus, in the semiconductor integrated circuit 1 for the white LED array shown in FIG. 1, it is not possible to increase the level of the reduced and selected minimum voltage to the reference voltage $V_{REF}$ (=Vref+$V_{SAT}$) where the forward voltages $V_F$ of the PN junctions of the LED devices D11 through D16, . . . , and D81 through D86 extremely increase due to the causes of an extreme drop in temperature, extreme variations in the characteristics of the LED devices.

As a result, the values of the first channel LED drive current $I_{LED<1>}$ through the eighth channel LED drive current $I_{LED<8>}$ are lowered more than an initial normal constant current value. Thus, since a voltage drop developed across the constant current setting resistor Rs is significantly reduced more than the reference voltage Vref, the differential amplifier 211 and the N channel MOS transistor 212 of each driver unit 21 of the constant current driver 20 are operated to increase the reduced voltage drop developed across the constant current setting resistor Rs to the reference voltage Vref.

That is, the differential amplifier 211 of the driver unit 21 supplies an extremely high level output voltage to the gate of the N channel MOS transistor 212 to compensate for the reduction in the first channel LED drive current $I_{LED<1>}$.

In a manner similar to the reduction in the level of the selected minimum voltage, however, the level of the first channel drive output voltage at the output terminal OUT1 of the driver unit 21 coupled to the cathode of the bottom-stage LED device D16 for the first channel, i.e., the drain terminal of the N channel MOS transistor 212 is also brought to a voltage level substantially lower than the reference voltage $V_{REF}$ (=Vref+$V_{SAT}$). Thus, the gate drive voltage substantially high in level has been supplied to the gate of the MOS transistor 212, whereas the considerably low drain-to-source voltage has been supplied between the drain and source of the MOS transistor 212.

Thus, upon a situation in which such operating voltages are supplied, the MOS transistor 212 is not able to operate in a saturated region (a region in which a drain current is constant substantially irrespective of the drain-to-source voltage) of the MOS transistor, which is suitable to obtain a constant current characteristic. The MOS transistor 212 is operated in a linear region (a region in which a drain current changes substantially depending on the drain-to-source voltage) of the MOS transistor, which is disadvantageous for obtaining a constant current characteristic. As a result, even if the differential amplifier 211 of the driver unit 21 supplies the output voltage extremely high in level to the gate of the N channel MOS transistor 212, it is not possible to compensate for the reduction in the first LED drive current $I_{LED<1>}$. The first channel LED drive current $I_{LED<1>}$ will decrease. It has been revealed by the study made by the present inventors, et al. prior to the present invention that the driver units 22 (not shown) through 28 of other channels in the constant current driver 20 are also exactly similar to the driver unit 21 and the values of other second channel LED drive current $I_{LED<2>}$ (not shown) through eighth channel LED drive current $I_{LED<8>}$ are also reduced more than the initial normal constant current value.

It has also been revealed by the study made by the present inventors prior to the present invention that the points each set to the voltage equivalent to the reference voltage $V_{REF}$ are often selected and changed over to any of the output terminals OUT1 through OUT8 and the feedback voltage $V_{FB}$ according to the state of driving of the first channel LED drive current $I_{LED<1>}$ through the eighth channel LED drive current $I_{LED<8>}$ by the driver units 21 through 28, so that the system is not stabilized and is liable to be unstable in operation.

The present invention has been made as a result of the above-described studies made by the present inventors, et al. prior to the present invention.

It is thus an object of the present invention to provide a semiconductor integrated circuit for controlling and driving light emitting devices, which is capable of generating the optimum drive voltage even with respect to fluctuations in temperature and variations in the characteristics of the light emitting devices, etc. and reducing power consumption of a system.

The above and other objects and novel features of the present invention will be apparent from the description of the present specification and the accompanying drawings.

A typical one of the inventive aspects of the invention disclosed in the present application will be briefly described as follows:

A typical embodiment of the present invention is a semiconductor integrated circuit (1) capable of driving a plurality of channels of a light emitting device array in parallel.

The semiconductor integrated circuit is equipped with a DC-DC converter (10), a current driver (20), a logic unit (30) and a D/A converter (50).

The DC-DC converter supplies an output voltage ($V_{OUT}$) generated by stepping-up or stepping-down an input voltage ($V_{IN}$) to a plurality of one anodes for the channels of the light emitting device array in common.

The current driver has a plurality of driver units (21 through 28) which drive a plurality of other cathodes for the channels of the light emitting device array.

Each of the driver units includes a drive transistor (212) which drives the other cathode of each of the channels of the light emitting device array, and a detector (213) which detects an abnormality of a drive current of the drive transistor.

The logic unit generates digital data (DATA_VREF<6:0>) in response to a plurality of detection signals (LIMIT<1> through LIMIT<8>) generated from the detectors of the driver units in the current driver and supplies the same to an input terminal of the D/A converter.

The D/A converter generates an analog voltage in response to the digital data and supplies the same to the DC-DC converter as a reference voltage ($V_{REF}$).

The logic unit performs a calibration operation which determines the digital data for setting the lowest or minimum output DC voltages at normal operations of all channels during which all of the detection signals generated from the detectors do not indicate the abnormalities of the drive currents (refer to FIG. 2).

An advantageous effect obtained by a typical one of the invention disclosed in the present application will be briefly explained as follows:

According to the present invention, it is possible to generate the optimum drive voltage even with respect to fluctuations in temperature and variations in the characteristics of light emitting devices, etc. and thereby reduce power consumption of a system.

DETAILED DESCRIPTION

1. Summary of the Embodiments

Figure 1:
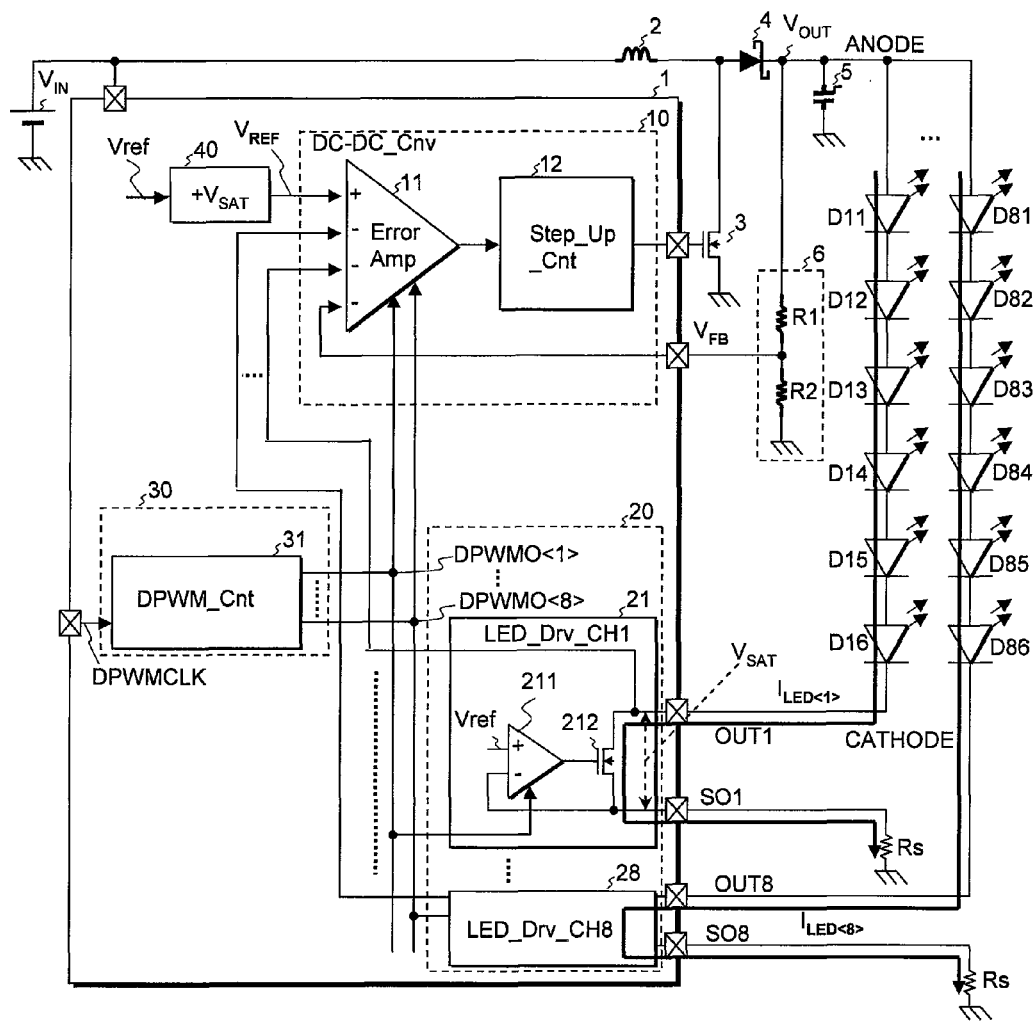
FIG. 1 is a diagram showing the configuration of the semiconductor integrated circuit for controlling and driving the white LED array studied by the present inventors, et al. prior to the present invention.

A summary of typical embodiments of the invention disclosed in the present application will first be explained.

Reference numerals of the accompanying drawings referred to with parentheses in the description of the summary of the typical embodiments only illustrate elements included in the concept of components to which the reference numerals are given.

[1] A typical embodiment of the present invention is a semiconductor integrated circuit (1) capable of driving a plurality of channels of a light emitting device array in parallel.

The semiconductor integrated circuit includes a DC-DC converter (10), a current driver (20), a logic unit (30) and a D/A converter (50).

The DC-DC converter is capable of supplying an output voltage ($V_{OUT}$) generated by stepping-up or stepping-down an input voltage ($V_{IN}$) to a plurality of one anodes for the channels of the light emitting device array in common.

The current driver has a plurality of driver units (21 through 28) capable of driving a plurality of other cathodes for the channels of the light emitting device array.

Each of the driver units includes a drive transistor (212) which drives the other cathode of each of the channels of the light emitting device array, and a detector (213) capable of detecting an abnormality of a drive current of the drive transistor.

The logic unit is capable of generating digital data (DATA_VREF<6:0>) in response to a plurality of detection signals (LIMIT<1> through LIMIT<8>) generated from the detectors of the drive units in the current driver and supplying the same to an input terminal of the D/A converter.

The D/A converter is capable of generating an analog voltage in response to the digital data and supplying the same to the DC-DC converter as a reference voltage ($V_{REF}$).

Figure 2:
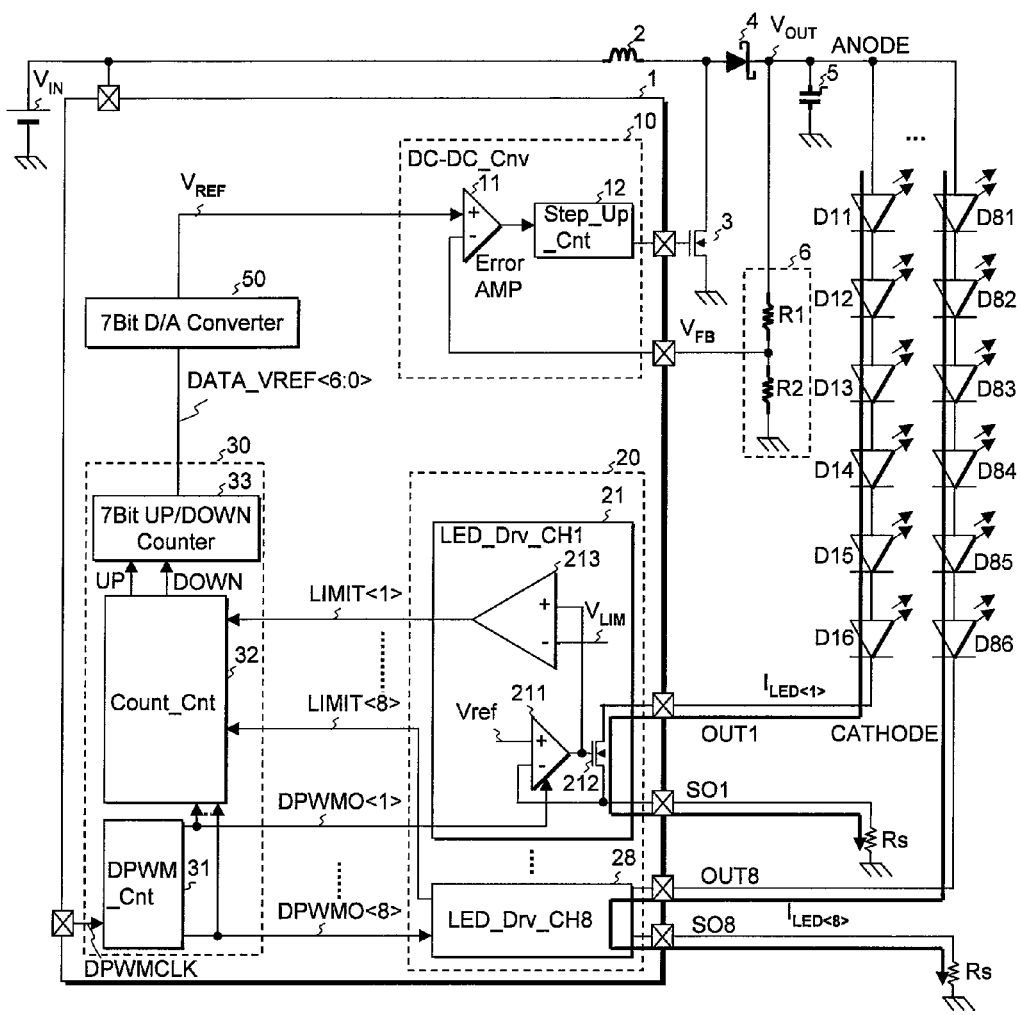
FIG. 2 is a diagram illustrating a configuration of a semiconductor integrated circuit for controlling and driving a white LED array, according to a first embodiment of the present invention.

The logic unit performs a calibration operation which determines the digital data for setting the lowest or minimum output DC voltages at normal operations of all channels during which none of the detection signals shows the abnormalities of the drive currents (refer to FIG. 2).

According to the embodiment, it is possible to reduce fluctuations in light emitting brightness of each light emitting device even with respect to fluctuations in temperature and variations in the characteristics of each light emitting device, etc.

In a preferred embodiment, prior to execution of the calibration operation, the logic unit supplies the digital data set to a predetermined initial value to the input terminal of the D/A converter. Thereafter, the logic unit starts execution of the calibration operation (refer to FIG. 2).

Figure 4:
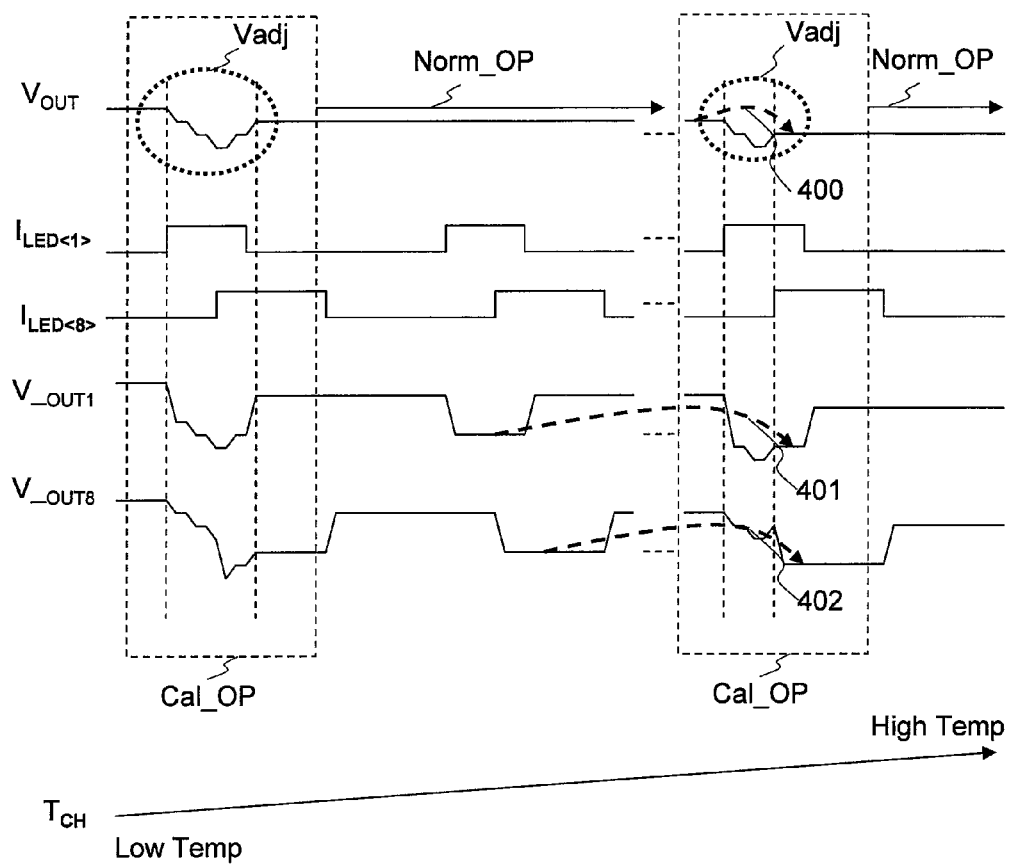
FIG. 4 is a diagram showing the manner in which when a predetermined time elapses during drive operations of D11 through D16, . . . , and D81 through D86 of the white LED array by the semiconductor integrated circuit 1 shown in FIG. 2, the calibration operation for the output DC voltage $V_{OUT}$ shown in FIG. 3 is executed on a regular basis.

In another preferred embodiment, when a predetermined time elapses during a drive operation in which the channels of the light emitting device array are driven by the current driver, the logic unit performs the calibration operation on a regular basis (refer to FIG. 4).

In a further preferred embodiment, prior to the execution of the calibration operation, the logic unit supplies the digital data set to the predetermined initial value to the input terminal of the D/A converter. Thereafter, each time the normal operations of all channels are confirmed by the execution of the calibration operation, the logic unit sequentially resets the digital data to a value smaller that the predetermined initial value.

Figure 3:
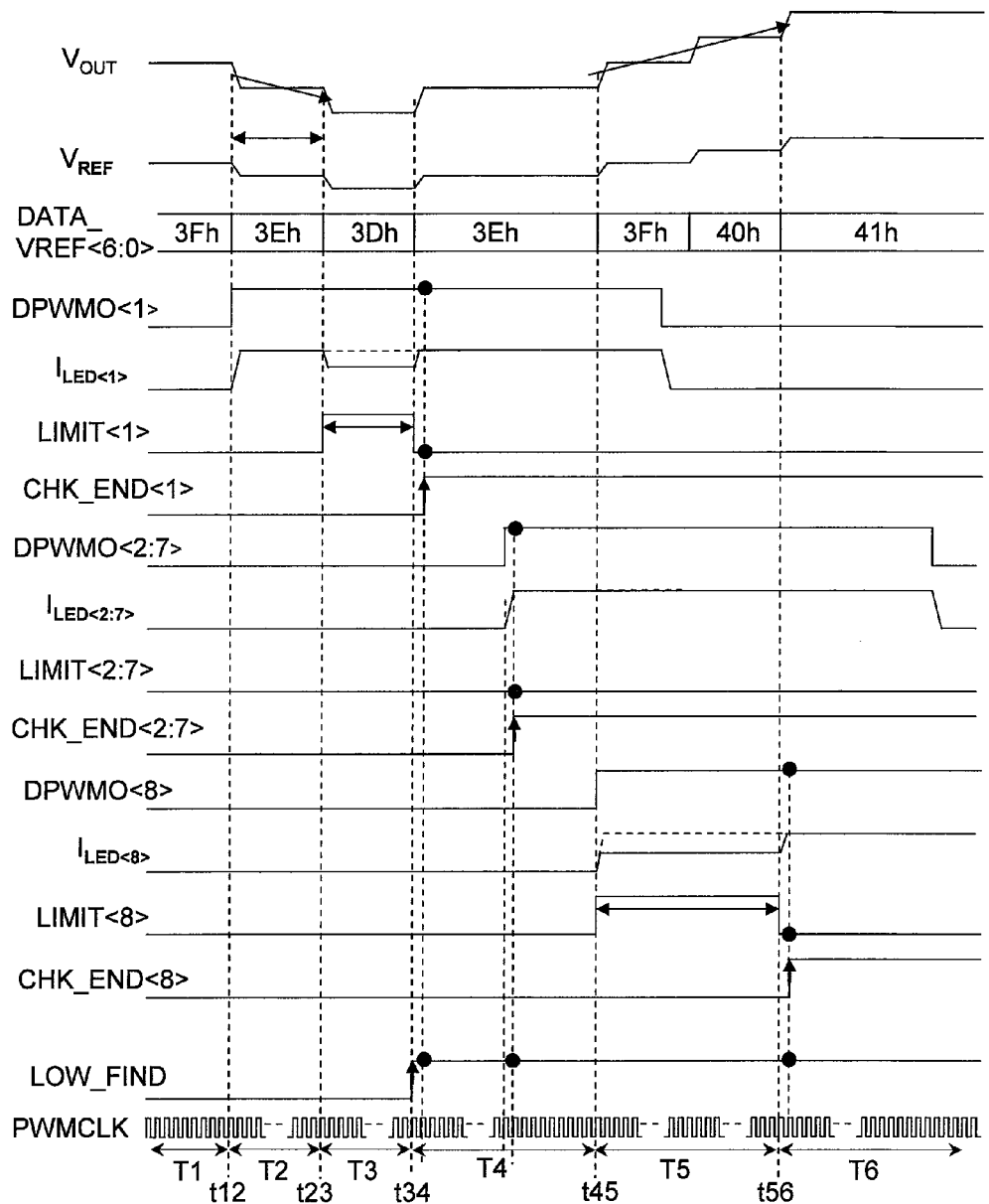
FIG. 3 is a diagram showing waveforms of respective parts of the semiconductor integrated circuit 1 shown in FIG. 2, for describing a calibration operation for an output DC voltage $V_{OUT}$, which is carried out by the semiconductor integrated circuit 1.
Figure 5:
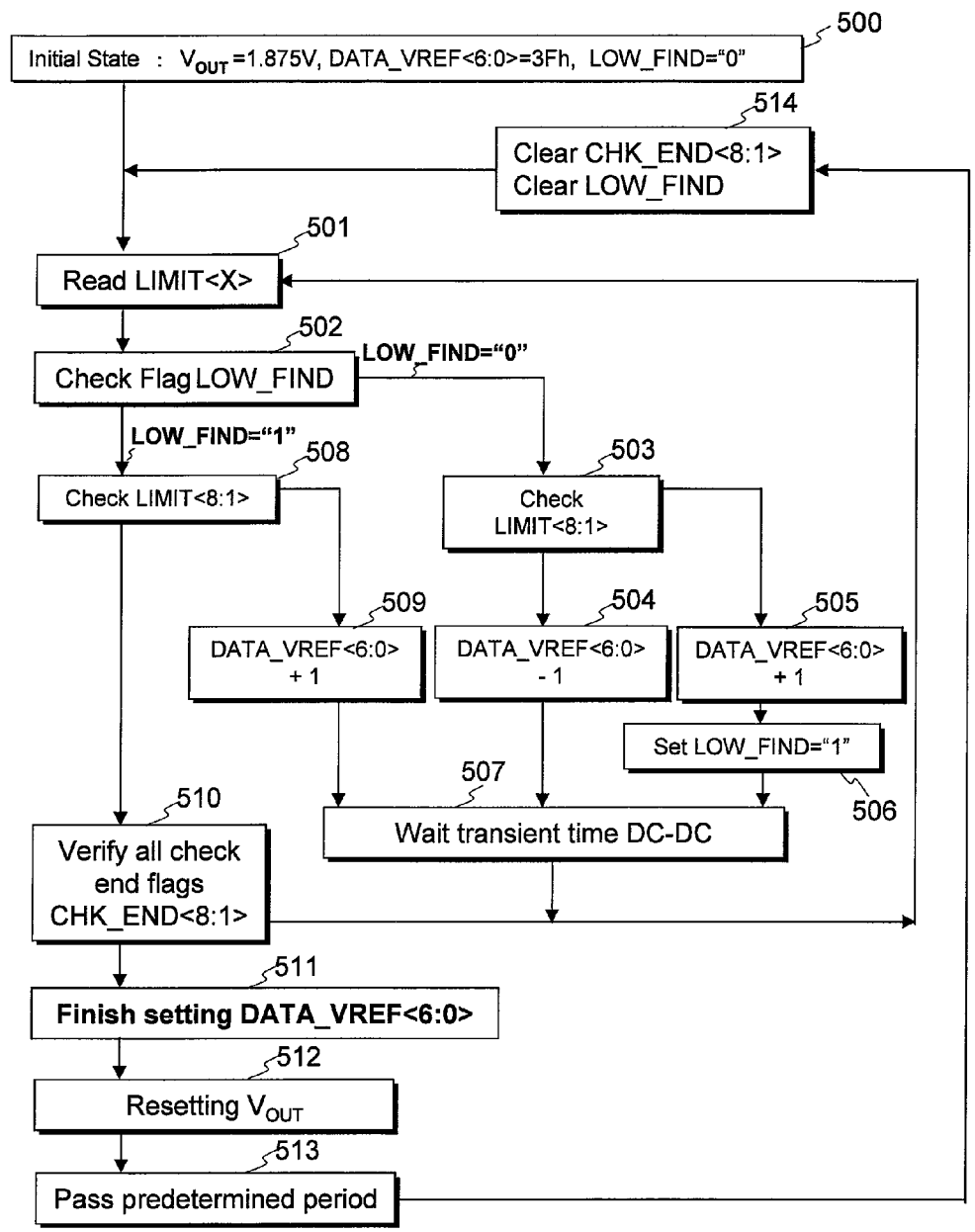
FIG. 5 is a diagram showing a processing flow of a calibration operation for an output voltage $V_{OUT}$ according to a second embodiment of the present invention, which is carried out in the semiconductor integrated circuit 1 of the present invention shown in FIG. 2.

When the normal operations of all the channels are not confirmed by the subsequent execution of the calibration operation, the value of the digital data is restored to a value in a state in which the normal operations of all the channels have finally been confirmed (refer to FIGS. 3 and 5).

In a more preferred embodiment, each of the driver units further includes a differential amplifier (211) having a non-inversion input terminal supplied with a reference voltage (Vref), an inversion input terminal to which a common terminal of the drive transistor is coupled, and an output terminal to which a control input terminal of the drive transistor is coupled.

A constant current setting resistor (Rs) is couplable between the inversion input terminal of the differential amplifier (211) of each driver unit and both the common terminal of the drive transistor and a ground potential.

One of the control input terminal of the drive transistor and the common terminal is coupled to one input terminal of the detector of each of the driver units. The other input terminal of the detector of each driver unit is supplied with a detection criterion voltage ($V_{LIM}$) (refer to FIGS. 2 and 6).

Figure 6:
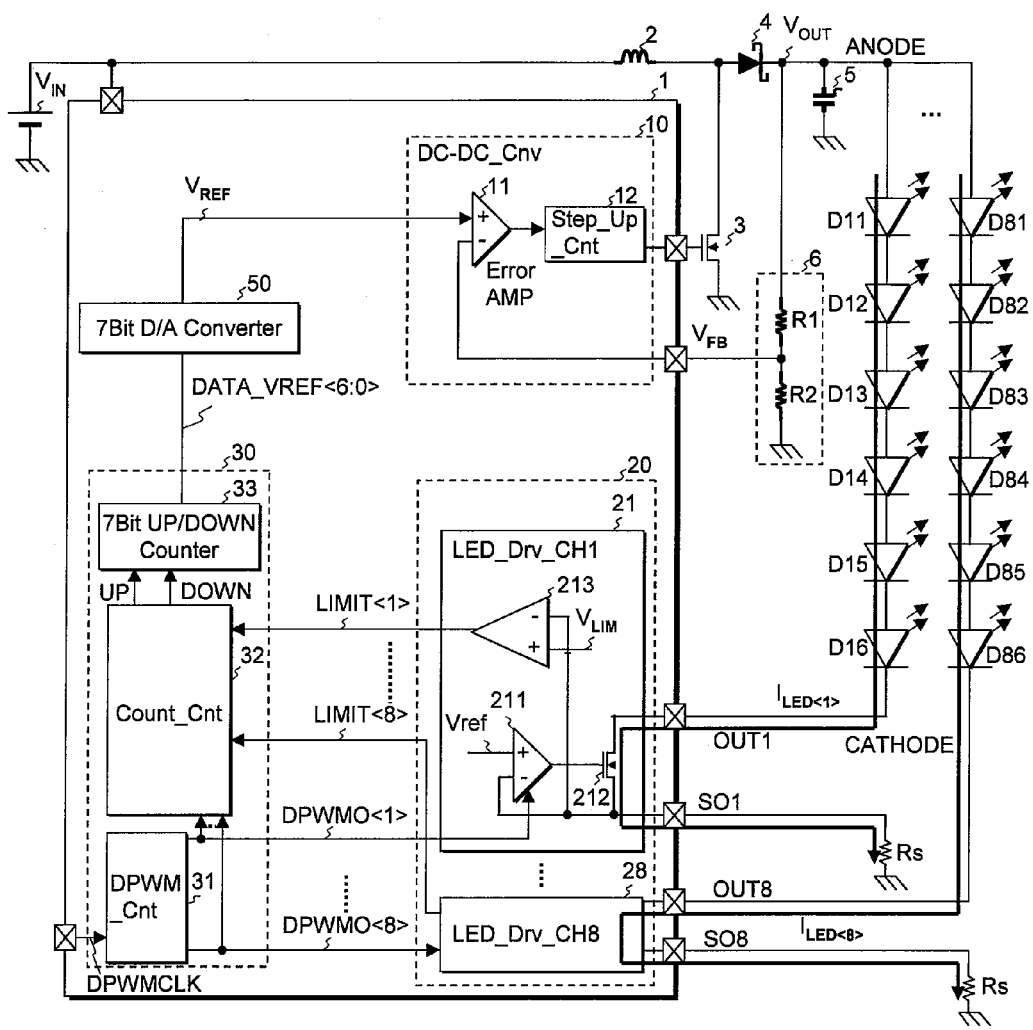
FIG. 6 is a diagram illustrating a configuration of a semiconductor integrated circuit for controlling and driving a white LED array, according to a third embodiment of the present invention.

In another more preferred embodiment, the logic unit includes a counter (33) which stores the value of the digital data therein, and a counter controller (32) which sequentially updates the value of the digital data stored in the counter in response to the detection signals from the detectors (refer to FIGS. 2 and 6).

In a further more preferred embodiment, the logic unit further includes a dimming controller (31) which generates a plurality of dimming pulse-width modulation drive signals (DPWMO<1> through <8>).

The driver units are respectively activated by the dimming pulse-width modulation drive signals generated from the dimming controller (refer to FIGS. 2 and 6).

In yet another more preferred embodiment, the dimming controller generates the dimming pulse-width modulation drive signals with mutually different generation timings by a distributed drive system (refer to FIGS. 2 and 6).

In a concrete embodiment, an inductor (2), a power MOS transistor (3) and a smoothing capacitor (5) are couplable to the DC-DC converter outside the semiconductor integrated circuit.

The DC-DC converter repeatedly drives the power MOS transistor during on and off periods to thereby generate the output DC voltage (refer to FIGS. 2 and 6).

In the most concrete embodiment, the driver units of the current driver are capable of driving the channels of the light emitting device array comprised of a plurality of light emitting diodes each having a PN junction (refer to FIGS. 2 and 6).

[2] A typical embodiment according to another aspect of the present invention is an operation method of a semiconductor integrated circuit (1), which is capable of driving a plurality of channels of a light emitting device array in parallel.

The semiconductor integrated circuit includes a DC-DC converter (10), a current driver (20), a logic unit (30) and a D/A converter (50).

The DC-DC converter is capable of supplying an output DC voltage ($V_{OUT}$) generated by boosting or stepping up an input DC voltage ($V_{IN}$) to a plurality of one anodes of the channels of the light emitting device array in common.

The current driver has a plurality of driver units (21 through 28) capable of driving a plurality of other cathodes of the channels of the light emitting device array.

Each of the driver units includes a drive transistor (212) which drives the other cathode of each of the channels of the light emitting device array, and a detector (213) capable of detecting an abnormality of a drive current of the drive transistor.

The logic unit is capable of generating digital data (DATA_VREF<6:0>) in response to a plurality of detection signals (LIMIT<1> through LIMIT<8>) generated from the detectors of the drive units in the current driver and supplying the same to an input terminal of the D/A converter.

The D/A converter is capable of generating an analog voltage in response to the digital data and supplying the same to the DC-DC converter as a reference voltage ($V_{REF}$).

The logic unit performs a calibration operation which determines the digital data for setting the lowest output DC voltages at normal operations of all channels during which none of the detection signals sent from the detectors indicates the abnormalities of the drive currents (refer to FIG. 2).

According to the embodiment, it is possible to reduce fluctuations in light emitting brightness of each light emitting device even with respect to fluctuations in temperature and variations in the characteristics of each light emitting device, etc.

2. Further Detailed Description of the Embodiments

Embodiments will next be explained in further detail. Incidentally, in all of the drawings for explaining the best modes for carrying out the invention, the same reference numerals are respectively attached to components having the same function as in the drawings, and their repetitive description will be omitted.

First Embodiment

<<Configuration of Semiconductor Integrated Circuit>>

FIG. 2 is a diagram showing a configuration of a semiconductor integrated circuit for controlling and driving a white LED array, according to a first embodiment of the present invention.

The semiconductor integrated circuit 1 shown in FIG. 2 is comprised of a step-up DC-DC converter 10, a constant current driver 20 having eight channels (eight strings), a logic unit 30 and a reference voltage generation D/A converter 50. The logic unit 30 includes a 12-bit (4096-gradation) dimming controller 31, a counter controller 32 and an up/down counter 33. In the example of FIG. 2, for example, the DC-DC converter 10 is configured as a step-up DC-DC converter since an input DC voltage $V_{IN}$ is a relatively low voltage as in the case where its voltage range is from 10V to 26.0V. As another example, the DC-DC converter 10 is configured as a step-down DC-DC converter where the input DC voltage $V_{IN}$ is a relatively high voltage. As a further example, the DC-DC converter 10 is configured as a step-up/step-down DC-DC converter where the input DC voltage $V_{IN}$ changes between a relatively low voltage and a relatively high voltage.

<<Switching Regulator>>

As shown in FIG. 2, the semiconductor integrated circuit 1 is supplied with the input DC voltage $V_{IN}$ having the voltage range from 10V to 26.0V, for example. Further, in order to configure a switching regulator, an inductor 2, an N channel power MOS transistor 3, a rectifying diode 4 that is a schottky diode, for example, a smoothing capacitor 5 and a feedback circuit 6 are couplable to the semiconductor integrated circuit 1. The input DC voltage $V_{IN}$ is coupled to one end of the inductor 2. The other end of the inductor 2 is coupled to a drain terminal of the power MOS transistor 3 and an anode of the rectifying diode 4. A cathode of the rectifying diode 4 is coupled to the feedback circuit 6, the smoothing capacitor 5 and a plurality of anodes of top-stage LED devices D11 through D81 of eight channels. A plurality of cathodes of bottom-stage LED devices D16 through D86 of the eight channels are coupled to their corresponding output terminals OUT1 through OUT8 of driver units 21 through 28 of eight channels lying inside the constant current driver 20. Constant current setting resistors Rs are respectively coupled between constant current setting terminals SO1 through SO8 of the driver units 21 through 28 of the eight channels in the constant current driver 20 and a ground potential.

<<Constant Current Driver>>

The driver unit 21 of the constant current driver 20 is comprised of a differential amplifier 211, an N channel MOS transistor 212 and an abnormality detection comparator 213. A non-inversion input terminal of the differential amplifier 211 is supplied with a reference voltage Vref. An output terminal of the differential amplifier 211 is coupled to a gate terminal of the N channel MOS transistor 212. A source terminal of the N channel MOS transistor 212 is coupled to an inversion input terminal of the differential amplifier 211 and one end of the constant current setting resistor Rs. The other end of the constant current setting resistor Rs is coupled to the ground potential. A drain terminal of the N channel MOS transistor 212 is coupled to the cathode of the bottom-stage LED device D16 of the first channel through the output terminal OUT1 of the driver unit 21.

The differential amplifier 211 and the N channel MOS transistor 212 of the driver unit 21 included in the constant current driver 20 operate as a voltage follower. For this reason, both ends of the constant current setting resistor Rs are supplied with the reference voltage Vref so that the value of a first channel LED drive current $I_{LED<1>}$ that flows into the LED devices D11 through D16 of the first channel is set. Thus, the light emitting brightness of the LED devices D11 through D16 of the white LED array at the time that the high level of a dimming pulse-width modulation scheme drive signal DPWMO<1> is a duty of 100%, can respectively be set to a desired value.

A non-inversion input terminal of the abnormality detection comparator 213 of the driver unit 21 included in the constant current driver 20 is supplied with a voltage at the gate terminal of the N channel MOS transistor 212. An inversion input terminal thereof is supplied with an abnormality detection criterion voltage $V_{LIM}$. An abnormality detection determination signal LIMIT<1> at an output terminal of the abnormality detection comparator 213 is supplied to the counter controller 32 of the logic unit 30.

The driver units 22 (not shown) through 28 of other channels provided inside the constant current driver 20 also include abnormality detection comparators exactly in the same manner as the driver unit 21 and further include differential amplifiers and N channel MOS transistors for voltage follower operations. The values of other second channel LED drive current $I_{LED<2>}$ (not shown) through eighth channel LED drive current $I_{LED<8>}$ are set. Thus, abnormality detection determination signals LIMIT<2> (not shown) through LIMIT<8> of the driver units 22 (not shown) through 28 are also respectively supplied to the counter controller 32 of the logic unit 30 in a manner similar to the abnormality detection determination signal LIMIT<1>.

<<Logic Unit>>

The logic unit 30 includes a dimming controller 31, a counter controller 32 and an up/down counter 33.

The dimming controller 31 of the logic unit 30 is supplied with 1-bit serial dimming control data in sync with a dimming clock DPWMCLK. The dimming controller 31 supplies the dimming pulse-width modulation scheme drive signals DPWMO<1> through <8> to the driver units 21 through 28 of the constant current driver 20 in response to the dimming control data. The dimming pulse-width modulation scheme drive signals DPWMO<1> through <8> enable dimming of the light emitting brightness of the LEDs according to the ratio between high and low level periods. Further, the dimming pulse-width modulation scheme drive signals DPWMO<1> through <8> generated from the dimming controller 31 are supplied even to the counter controller 32.

Further, the differential amplifier 211 and the N channel MOS transistor 212 of the driver unit 21 are activated in response to the dimming pulse-width modulation scheme drive signal DPWMO<1> high in level, so that the first channel LED drive current $I_{LED<1>}$ of the LED devices D11 through D16 of the first channel can be driven. The driver units 22 (not shown) through 28 of other channels provided inside the constant current driver 20 are also exactly similar to the driver unit 21. The differential amplifiers of the driver units 22 through 28 and the N channel MOS transistors thereof are respectively activated in response to the dimming pulse-width modulation scheme drive signals DPWMO<2> through <8> high in level, so that the respective channel LED drive currents can be driven.

The counter controller 32 generates an up signal UP and a down signal DOWN supplied to the up/down counter 33 in response to the dimming pulse-width modulation scheme drive signals DPWMO<1> through <8> supplied from the dimming controller 31 and the abnormality detection determination signals LIMIT<1> through LIMIT<8> supplied from the driver units 21 through 28 of the constant current driver 20.

The up/down counter 33 increments a 7-bit count value by +1 in response to one up signal UP supplied from the counter controller 32, whereas the up/down counter 33 decrements the 7-bit count valve by −1 in response to one down signal DOWN supplied from the counter controller 32.

<<Reference Voltage Generation D/A Converter>>

The reference voltage generation D/A converter 50 performs A/D conversion for generating a reference voltage $V_{REF}$ in response to the 7-bit count value stored in the up/down counter 33.

<<Switching Regulator>>

The step-up DC-DC converter 10 operated as the switching regulator is comprised of an error amplifier 11 and a controller 12. A non-inversion input terminal of the error amplifier 11 is supplied with the reference voltage $V_{REF}$ generated from the reference voltage generation D/A converter 50. An inversion input terminal of the error amplifier 11 is supplied with a feedback voltage $V_{FB}$ generated from the feedback circuit 6. Incidentally, the feedback voltage $V_{FB}$ is generated by dividing an output DC voltage $V_{OUT}$ generated from the cathode of the rectifying diode 4 by two division resistors R1 and R2 of the feedback circuit 6.

The switching regulator comprised of the step-up DC-DC converter 10, the inductor 2, the N channel power MOS transistor 3, the rectifying diode 4 and the smoothing capacitor 5 repeats an on period of the power MOS transistor 3 and an off period of thereof to thereby perform a pulse width modulation (PWM) operation for generating the output DC voltage $V_{OUT}$ from the cathode of the rectifying diode 4.

Assuming that the inductance of the inductor 2 is L and the time is t, a current given by the following equation flows from the input DC voltage $V_{IN}$ to the ground potential through the inductor 2 and the power MOS transistor 3 during the on period of the power MOS transistor 3:

$$I_{ON}=V_{IN} \cdot t/L \quad (5)$$

During the off period of the power MOS transistor 3 after the on period thereof, a current given by the following equation flows from the input DC voltage $V_{IN}$ to the smoothing capacitor 5 through the inductor 2 and the rectifying diode 4:

$$I_{OFF}=(V_{IN}-V_{OUT}) \cdot t/L \quad (6)$$

Assuming that the on period of the power MOS transistor 3 is $T_{ON}$ and the off period of the power MOS transistor 3 is $T_{OFF}$, the current given by the equation (5) and the current given by the equation (6) should be made equal to each other at the boundary between both periods. Accordingly, the following equation is obtained:

$$V_{IN} \cdot T_{ON}/L=(V_{IN}-V_{OUT}) \cdot T_{OFF}/L \quad (7)$$

Expanding the equation (7) yields the relationship of the following equation:

$$V_{OUT}=(1+(T_{ON}/T_{OFF})) \cdot V_{IN} \quad (8)$$

This equation (8) shows that the switching regulator comprised of the step-up DC-DC converter 10, the inductor 2, the N channel power MOS transistor 3, the rectifying diode 4 and the smoothing capacitor 5 generates an output DC voltage $V_{OUT}$ having a voltage larger than a voltage contained in the input DC voltage $V_{IN}$.

On the other hand, the feedback voltage $V_{FB}$ obtained by division of the output DC voltage $V_{OUT}$ by the division resistors R1 and R2 of the feedback circuit 6 is supplied to the inversion input terminal of the error amplifier 11, and the non-inversion input terminal of the error amplifier 11 is supplied with the reference voltage $V_{REF}$ generated from the reference voltage generation D/A converter 50. For this reason, the error amplifier 11 is operated in such a manner that the level of the feedback voltage $V_{FB}$ coincides with the level of the step-up reference voltage $V_{REF}$ to thereby generate an output DC voltage $V_{OUT}$. That is, the controller 12 determines the ratio between the on period $T_{ON}$ and the off period $T_{OFF}$ according to the ratio between a rising period of a pulse-width modulated (PWM) triangular waveform and a falling period thereof in such a manner that both voltage levels coincide with each other.

Thus, when the DC-DC converter 10 is of the step-up DC-DC converter as shown in FIG. 2, an output DC voltage $V_{OUT}$ having a voltage larger than a voltage contained in the input DC voltage $V_{IN}$ is generated. When the DC-DC converter 10 is of the step-down DC-DC converter illustrated as another example, an output DC voltage $V_{OUT}$ having a voltage smaller than a voltage contained in the input DC voltage $V_{IN}$ is generated. When the DC-DC converter 10 is of the step-up/step-down DC-DC converter, an output DC voltage $V_{OUT}$ having a voltage larger than a voltage contained in the input DC voltage $V_{IN}$ and an output DC voltage $V_{OUT}$ having a voltage smaller than a voltage contained in the input DC voltage $V_{IN}$ are generated.

<<Operation of Semiconductor Integrated Circuit>>

When a predetermined time elapses while a plurality of LED devices D11 through D16, . . . , and D81 through D86 of a white LED array to which the LED devices are coupled, are being driven and operated, the semiconductor integrated circuit 1 according to the first embodiment of the present invention shown in FIG. 2 performs a calibration operation for an output DC voltage $V_{OUT}$ on a regular basis.

Prior to the calibration operation, the reference voltage generation D/A converter 50 generates a reference voltage $V_{REF}$ in response to the 7-bit count value stored in advance in the up/down counter 33 of the logic unit 30 and supplies it to the non-inversion input terminal of the error amplifier 11 of the step-up DC-Dc converter 10. Thus, the controller 12 of the step-up DC-Dc converter 10 determines the ratio between a rising period (on period $T_{ON}$) of a pulse-width modulated triangular waveform and a falling period (off period $T_{OFF}$) in response to the reference voltage $V_{REF}$ to thereby set the level of the output DC voltage $V_{OUT}$.

Assume that under the condition for setting the level of the output DC voltage $V_{OUT}$, the LED devices D11 through D16, . . . , and through D81 through D86 of the white LED array are driven by the semiconductor integrated circuit 1, so that the values of the first channel LED drive current $I_{LED<1>}$ through the eighth channel LED drive current $I_{LED<8>}$ are respectively set to a normal constant current value, and all of the LED devices D11 through D16, . . . , and D81 through D86 of the white LED array are respectively set to normal light emitting brightness.

When, however, the forward voltages $V_F$ of PN junctions of the LED devices D11 through D16, . . . , and D81 through D86 increase considerably due to an extreme reduction in temperature, the values of the first channel LED drive current $I_{LED<1>}$ through the eighth channel LED drive current $I_{LED<8>}$ become lower than the normal constant current value, so that a voltage drop developed across the constant current setting resistor Rs becomes substantially lower than the reference voltage Vref. Then, the differential amplifier 211 of the driver unit 21 supplies an output voltage extremely high in level to the gate of the N channel MOS transistor 212 to compensate for a decrease in the first channel LED drive current $I_{LED<1>}$. The driver units 22 (not shown) through 28 of other channels in the constant current driver 20 are exactly similar to the driver unit 21. The values of the second channel LED drive current $I_{LED<2>}$ through eighth channel LED drive current $I_{LED<8>}$ also become lower than the initial normal constant current value. For this reason, the respective differential amplifiers of the driver units 22 through 28 of other channels respectively supply an output voltage extremely high in level to the gates of the respective N channel MOS transistors to compensate for decreases in the respective channel LED drive currents.

Under such circumstances, the abnormality detection comparator 213 of the driver unit 21 in the constant current driver 20 detects that the drive voltage of the gate of the N channel MOS transistor 212, which is supplied to the non-inversion input terminal thereof is extremely higher than the abnormality detection criterion voltage $V_{LIM}$ supplied to the inversion input terminal thereof. As a result, the abnormality detection comparator 213 generates a high-level abnormality detection determination signal LIMIT<1> and supplies it to the counter controller 32 of the logic unit 30. The driver units 22 through 28 of other channels in the constant current driver 20 are also exactly similar to the driver unit 21. Their abnormality detection comparators generate high-level abnormality detection determination signals LIMIT<2> through LIMIT<8> and supply the same to the counter controller 32 of the logic unit 30.

When any of the abnormality detection determination signals LIMIT<1> through LIMIT<8> is high in level, the counter controller 32 of the logic unit 30 generates one up signal UP and supplies it to the up/down counter 33. Therefore, the up/down counter 33 increments a 7-bit count value by +1 in response to one up signal UP. Thus, the reference voltage generation D/A converter 50 generates a reference voltage $V_{REF}$ increased by a predetermined voltage more than before in response to the +1 updated count value of the up/down counter 33 and supplies it to the non-inversion input terminal of the error amplifier 11 of the step-up DC-DC converter 10. Thus, the controller 12 of the DC-DC converter 10 operates in response to the increased reference voltage $V_{REF}$ so that the level of the output DC voltage $V_{OUT}$ rises.

When the values of all the channel LED drive currents $I_{LED<1>}$ through $I_{LED<8>}$ are respectively restored to the initial normal constant current value with the rise in the output DC voltage $V_{OUT}$, voltage drops developed across all constant current setting resistors Rs are restored to the reference voltage Vref. Then, the counter controller 32 of the logic unit 30 generates neither the up signal UP nor the down signal DOWN in response to all of the abnormality detection determination signals LIMIT<1> through LIMIT<8> being low in level. For this reason, the 7-bit count value stored in the up/down counter 33 is held in the up/down counter 33 until before the execution of the following calibration operation without its updating.

When the values of all the channel LED drive currents $I_{LED<1>}$ through $I_{LED<8>}$ are not restored to the initial normal constant current value due to the rise in the output DC voltage $V_{OUT}$, any of the abnormality detection determination signals LIMIT<1> through LIMIT<8> is still high in level. Therefore, the counter controller 32 further generates one up signal UP and supplies it to the up/down counter 33. Thus, since the up/down counter 33 further increments the 7-bit count value by +1, the reference voltage generation D/A converter 50 generates a reference voltage $V_{REF}$ further increased by a predetermined voltage and supplies it to the non-inversion input terminal of the error amplifier 11 of the step-up DC-DC converter 10. As a result, the controller 12 of the DC-DC converter 10 operates in response to the further-incremented reference voltage $V_{REF}$ in such a manner that the level of the output DC voltage $V_{OUT}$ further rises. That is, the increment operation of the up/down counter 33, the increase in the reference voltage $V_{REF}$ of the reference voltage generation D/A converter 50, and the increase in the output DC voltage $V_{OUT}$ of the step-up DC-DC converter 10 are repeated until all of the abnormality detection determination signals LIMIT<1> through LIMIT<8> are brought to the low level.

During the calibration operation for the output DC voltage $V_{OUT}$ in an initialization sequence at power-on in which the input DC voltage $V_{IN}$ used as an operating power supply voltage is first supplied to the semiconductor integrated circuit 1 according to the first embodiment of the present invention shown in FIG. 2, the reference voltage generation D/A converter 50 generates a reference voltage $V_{REF}$ corresponding to an initial value in response to a predetermined initial value of the 7-bit count value stored in the up/down counter 33 of the logic unit 30 and supplies it to the non-inversion input terminal of the error amplifier 11 of the step-up DC-DC converter 10. Thus, the controller 12 of the step-up DC-DC converter 10 operates so as to generate the level of an output DC voltage $V_{OUT}$ corresponding to an initial value in response to the reference voltage $V_{REF}$ corresponding to the initial value. Incidentally, the counter controller 32 stores a predetermined initial value of 7 bits stored in a nonvolatile memory such as a read-only memory (ROM) or the like provided in the counter controller 32 in the up/down counter 33 in response to a power-on reset signal at power-on, for example. Alternatively, the counter controller 32 stores the predetermined initial value of 7 bits in a nonvolatile memory such as a read-only memory, a flash memory or the like in the semiconductor integrated circuit 1. The counter controller 32 may read the predetermined initial value of 7 bits from the nonvolatile memory in response to the power-on reset signal at power-on and store it in the up/down counter 33.

When all of the abnormality detection determination signals LIMIT<1> through LIMIT<8> are low in level under the condition in which the level of the output DC voltage $V_{OUT}$ corresponding to the initial value is generated, the counter controller 32 of the logic unit 30 generates one down signal DOWN and supplies it to the up/down counter 33. Therefore, the up/down counter 33 decrements the 7-bit count value by −1 in response to one down signal DOWN. As a result, the reference voltage generation D/A converter 50 generates a reference voltage $V_{REF}$ reduced by a predetermined voltage more than before in response to the −1 updated count value of the up/down counter 33 and supplies it to the non-inversion input terminal of the error amplifier 11 of the step-up DC-DC converter 10. Thus, the controller 12 of the DC-DC converter 10 operates in response to the decreased reference voltage $V_{REF}$ so that the level of the step-up output DC voltage $V_{OUT}$ is reduced.

When the values of all the channel LED drive currents $I_{LED<1>}$ through $I_{LED<8>}$ are respectively maintained at the normal constant current value even if the output DC voltage $V_{OUT}$ is lowered, all of the abnormality detection determination signals LIMIT<1> through LIMIT<8> are low in level. Therefore, the counter controller 32 further generates one down signal DOWN and supplies it to the up/down counter 33. Hence the up/down counter 33 further decrements the 7-bit count value by −1 in response to one down signal DOWN. Thus, the reference voltage generation D/A converter 50 generates a reference voltage $V_{REF}$ further reduced by a predetermined voltage in response to a second −1-updated count value of the up/down counter 33 and supplies it to the non-inversion input terminal of the error amplifier 11 of the step-up DC-DC converter 10. Accordingly, the controller 12 of the DC-DC converter 10 operates in response to the further-reduced reference voltage $V_{REF}$ in such a manner that the level of the output DC voltage $V_{OUT}$ is further reduced.

When any of the abnormality detection determination signals LIMIT<1> though LIMIT<8> becomes high in level with the further reduction in the output DC voltage $V_{OUT}$, the counter controller 32 generates an up signal UP used as a counter value final setting signal and supplies it to the up/down counter 33. Therefore, the up/down counter 33 restores the count value to a count value immediately before a reduction in the output DC voltage $V_{OUT}$ by a +1 increment of the 7-bit count value that has responded to the up signal UP corresponding to the counter value final setting signal. As a result, the reference voltage generation D/A converter 50 restores the reference voltage $V_{REF}$ to a voltage value immediately before a reduction in the output DC voltage $V_{OUT}$ in response to the restored count value of the up/down counter 33 and supplies it to the non-inversion input terminal of the error amplifier 11 of the step-up DC-DC converter 10. Thus, the controller 12 operates in response to the restored reference voltage $V_{REF}$ in such a manner that the level of the output DC voltage $V_{OUT}$ is restored to the voltage value immediately before the reduction in the level of the output DC voltage $V_{OUT}$. As a result, the values of all the channel LED drive currents ILED<1> through ILED<8> are respectively restored to the initial normal constant current value by this counter value final setting operation. That is, the constant current can be supplied to the white LED array by calibrating the value of the output DC voltage $V_{OUT}$, thereby making it possible to hold brightness constant.

Since the DC-DC converter 10 generates the output DC voltage $V_{OUT}$ with the two inputs of the reference voltage $V_{REF}$ and the feedback voltage $V_{FB}$ as the references, the system is always stable and unlikely to cause an instable operation.

FIG. 3 is a diagram showing waveforms at the respective parts of the semiconductor integrated circuit 1 according to the first embodiment of the present invention shown in FIG. 2, which are used for describing the calibration operation of the output DC voltage $V_{OUT}$, which is performed by the semiconductor integrated circuit 1.

Although not shown in detail in FIG. 3, the dimming pulse-width modulation scheme drive signals DPWMO<1> through DPWMO<8> supplied to the driver units 21 through 28 of the constant current driver 20 are placed under a distributed drive system even in the calibration operation exactly in the same manner as the normal operation period.

That is, the timing provided to change the second drive signal DPWMO<2> from a low level to a high level is rendered later by a predetermined time than the timing provided to change the first drive signal DPWMO<1> to a low level to a high level. The timing provided to change the third drive signal DPWMO<3> from a low level to a high level is rendered later by a predetermined time than the timing provided to change the second drive signal DPWMO<2> to a low level to a high level. The timing provided to change the fourth drive signal DPWMO<4> from a low level to a high level is rendered later by a predetermined time than the timing provided to change the third drive signal DPWMO<3> to a low level to a high level. The timing provided to change the fifth drive signal DPWMO<5> from a low level to a high level is rendered later by a predetermined time than the timing provided to change the fourth drive signal DPWMO<4> to a low level to a high level. The timing provided to change the sixth drive signal DPWMO<6> from a low level to a high level is rendered later by a predetermined time than the timing provided to change the fifth drive signal DPWMO<5> to a low level to a high level. The timing provided to change the seventh drive signal DPWMO<7> from a low level to a high level is rendered later by a predetermined time than the timing provided to change the sixth drive signal DPWMO<6> to a low level to a high level. The timing provided to change the eighth drive signal DPWMO<8> from a low level to a high level is rendered later by a predetermined time than the timing provided to change the seventh drive signal DPWMO<7> to a low level to a high level. As a result, it is possible to reduce a problem that the level of the output DC voltage $V_{OUT}$ of the DC-DC converter 10 is instantaneously lowered due to the fact that all the values of all channel LED drive current $I_{LED<1>}$ through $I_{LED<8>}$ suddenly increase approximately at the same time.

A first period T1 of FIG. 3 is a first period for the calibration operation of the output DC voltage $V_{OUT}$ in the initialization sequence at power-on in which the input DC voltage $V_{IN}$ corresponding to the operating power supply voltage is first supplied to the semiconductor integrated circuit 1. The count value of the up/down counter 33 is set to a predetermined initial value 3 Fh. The predetermined initial value 3 Fh is set to an input digital value almost midway in a dynamic range for D/A conversion of the reference voltage generation D/A converter 50. Thus, the reference voltage generation D/A converter 50 generates a reference voltage $V_{REF}$ corresponding to an initial value in response to a 7-bit count initial value 3 Fh stored in the up/down counter 33 and supplies it to the non-inversion input terminal of the error amplifier 11 of the step-up DC-DC converter 10. Thus, the controller 12 of the DC-DC converter 10 is operated so as to generate the level of the output DC voltage $V_{OUT}$ corresponding to the initial value in response to the reference voltage $V_{REF}$ corresponding to the initial value.

Since all of the abnormality detection determination signals LIMIT<1> through LIMIT<8> are low in level during the first period T1 of FIG. 3, the counter controller 32 of the logic unit 30 generates one down signal DOWN and supplies it to the up/down counter 33. During a second period T2 of FIG. 3, the up/down counter 33 decrements the count value by −1 in response to one down signal DOWN.

As a result, during the second period T2 of FIG. 3, the reference voltage generation D/A converter 50 generates a reference voltage $V_{REF}$ reduced by a predetermined voltage from the reference voltage $V_{REF}$ corresponding to the initial value in response to a −1-updated count value 3 Eh of the up/down counter 33 and supplies it to the non-inversion input terminal of the error amplifier 11 of the step-up DC-DC converter 10. Thus, the controller 12 of the step-up DC-DC converter 10 operates in response to the reduced reference voltage $V_{REF}$ in such a manner that the level of the output DC voltage $V_{OUT}$ is lowered. Further, a level change of the distributed system for the dimming pulse-width modulation scheme drive signals DPWMO<1> through DPWMO<8> from low to high levels is started from the second period T2 of FIG. 3. Thus, the driver unit 21 of the first channel starts driving of the first channel LED drive current $I_{LED<1>}$ during the second period T2 of FIG. 3.

When the value of the first channel LED drive current $I_{LED<1>}$ is maintained at the normal constant current value even if the output DC voltage $V_{OUT}$ is lowered during the second period T2 of FIG. 3, the abnormality detection determination signal LIMIT<1> for the first channel is low in level. Therefore, the counter controller 32 further generates one down signal DOWN and supplies it to the up/down counter 33. Hence the up/down counter 33 further decrements the count value by −1 in response to one down signal DOWN.

As a result, during a third period T3 of FIG. 3, the reference voltage generation D/A converter 50 generates a reference voltage $V_{REF}$ reduced by a predetermined voltage in response to a −1-updated count value 3 Dh of the up/down counter 33 and supplies it to the non-inversion input terminal of the error amplifier 11 of the step-up DC-DC converter 10. Accordingly, the step-up controller 12 of the DC-DC converter 10 operates in response to the further-reduced reference voltage $V_{REF}$ in such a manner that the level of the output DC voltage $V_{OUT}$ is further reduced.

Since the output DC voltage $V_{OUT}$ is lowered during the third period T3 of FIG. 3, the value of the first channel LED drive current $I_{LED<1>}$ becomes lower than the initial normal constant current value. Thus, the abnormality detection determination signal LIMIT<1> that is high in level is generated from the output terminal of the abnormality detection comparator 213 of the driver unit 21 of the constant current driver 20 and supplied to the counter controller 32 of the logic unit 30. As a result, the counter controller 32 generates one up signal UP and supplies it to the up/down counter 33. During a fourth period T4 of FIG. 3, the up/down counter 33 increments the count value by +1 in response to one up signal UP and restores it to the immediately preceding updated count value 3 Eh.

As a result, during the fourth period T4 of FIG. 3, the reference voltage generation D/A converter 50 generates an update immediately-preceding reference voltage $V_{REF}$ increased by a predetermined voltage than the reference voltage $V_{REF}$ at the third period T3 in response to the +1-restored count value 3 Eh of the up/down counter 33 and supplies it to the non-inversion input terminal of the error amplifier 11 of the step-up DC-DC converter 10. Thus, the controller 12 of the DC-DC converter 10 operates the level of the output DC voltage $V_{OUT}$ so as to rise to an update immediately-preceding voltage level and be restored thereto in response to the update immediately-preceding reference voltage $V_{REF}$. As a result, since the value of the first channel LED drive current $I_{LED<1>}$ more lowered than the initial normal constant current value rises to the initial normal constant current value, the abnormality detection determination signal LIMIT<1> for the first channel changes from low to high levels. Thus, the counter controller 32 of the logic unit 30 changes a low voltage find signal LOW_FIND indicative of first finding of the minimum voltage of the output DC voltage $V_{OUT}$ from a low level to a high level in response to a to-and-fro status transition in which the abnormality detection determination signal LIMIT<1> for the first channel changes from low to high levels at a time t23 and further changes from high to low levels at a time t34. Further, the counter controller 32 reads that in a state in which the low voltage find signal LOW_FIND is high in level, the pulse-width modulation scheme drive signal DPWMO<1> for the first channel is maintained at a high level and the abnormality detection determination signal LIMIT<1> for the first channel is maintained at a low level. Then, the counter controller 32 determines that the value of the first channel LED drive current $I_{LED<1>}$ is of the normal constant current value and writes a high level into a high-level first channel check end signal CHK_END<1> indicative of completion of the calibration operation for the output DC voltage $V_{OUT}$ related to the driver unit 21 for the first channel.

Further, since the second channel LED drive current $I_{LED<2>}$ through seventh channel LED drive current $I_{LED<7>}$ are maintained at the initial normal constant current value while the output DC voltage $V_{OUT}$ is maintained at the update immediately-preceding voltage level during the fourth period T4 of FIG. 3, all of the abnormality detection determination signal LIMIT<2> for the second channel through the abnormality detection determination signal LIMIT<7> for the seventh channel are maintained at a low level.

Thus, the counter controller 32 of the logic unit 30 reads that during the fourth period T4 of FIG. 3, the low voltage find signal LOW_FIND is maintained at the high level, the pulse-width modulation scheme drive signal DPWMO<2> for the second channel through the pulse-width modulation scheme drive signal DPWMO<7> for the seventh channel are maintained at the high level, and the abnormality detection determination signal LIMIT<2> for the second channel through the abnormality detection determination signal LIMIT<7> for the seventh channel are maintained at the low level, and writes a high level into each of a second channel check end signal CHK_END<2> through a seventh channel check end signal CHK_END<7> that are low in level.

During a fifth period T5 of FIG. 3, the driver unit 28 for the eighth channel starts driving of the eighth channel LED drive current $I_{LED<8>}$ in response to a change of the pulse-width modulation scheme drive signal DPWMO<8> for the eighth channel from a low level to a high level. Since, however, the value of the eighth channel LED drive current $I_{LED<8>}$ is made lower than the normal constant current value, a high-level abnormality detection determination signal LIMIT<8> is generated from the output terminal of the abnormality detection comparator of the driver unit 28 in the constant current driver 20 and supplied to the counter controller 32 of the logic unit 30. Thus, the counter controller 32 generates one up signal UP and supplies it to the up/down counter 33. During the first half of the fifth period T5 of FIG. 3, the up/down counter 33 increments the count value by +1 in response to one up signal UP to change it to a +1-updated count value 3 Fh.

Thus, during the first half of the fifth period T5 of FIG. 3, the reference voltage generation D/A converter 50 generates a reference voltage $V_{REF}$ increased by a predetermined voltage from the reference voltage $V_{REF}$ at the fourth period T4 in response to the +1-updated count value 3 Fh of the up/down counter 33 and supplies it to the non-inversion input terminal of the error amplifier 11 of the step-up DC-DC converter 10. Thus, the controller 12 of the DC-DC converter 10 operates to raise and reset the level of the output DC voltage $V_{OUT}$ in response to the increased reference voltage $V_{REF}$.

However, despite the rise in the level of the output DC voltage $V_{OUT}$ at the first half of the fifth period T5 of FIG. 3, the value of the eighth channel LED drive current $I_{LED<8>}$ remains lower than the normal constant current value. As a result, a high-level abnormality detection determination signal LIMIT<8> is generated from the output terminal of the abnormality detection comparator of the driver unit 28 of the constant current driver 20 and supplied to the counter controller 32 of the logic unit 30. Thus, the counter controller 32 generates one up signal UP and supplies it to the up/down counter 33. During the latter half of the fifth period T5 of FIG. 3, the up/down counter 33 increments the count value by +1 in response to one up signal UP to change it to a +1-updated count value 40 h.

Thus, during the latter half of the fifth period T5 of FIG. 3, the reference voltage generation D/A converter 50 generates a reference voltage $V_{REF}$ more increased by a predetermined voltage than the reference voltage $V_{REF}$ at the fourth period T4 in response to the +1-updated count value 40 h of the up/down counter 33 and supplies it to the non-inversion input terminal of the error amplifier 11 of the step-up DC-DC converter 10. Accordingly, the controller 12 of the DC-DC converter 10 operates so as to raise the level of the output DC voltage $V_{OUT}$ in response to the increased reference voltage $V_{REF}$.

However, despite the rise in the level of the output DC voltage $V_{OUT}$ at the latter half of the fifth period T5 of FIG. 3, the value of the eighth channel LED drive current $I_{LED<8>}$ remains lower than the normal constant current value. As a result, a high-level abnormality detection determination signal LIMIT<8> is generated from the output terminal of the abnormality detection comparator of the driver unit 28 of the constant current driver 20 and supplied to the counter controller 32 of the logic unit 30. Thus, the counter controller 32 generates one up signal UP and supplies it to the up/down counter 33. During a sixth period T6 of FIG. 3, the up/down counter 33 increments the count value by +1 in response to one up signal UP to change it to a +1-updated count value 41 h.

Thus, during the sixth period T6 of FIG. 3, the reference voltage generation D/A converter 50 generates a reference voltage $V_{REF}$ more increased by a predetermined voltage than the reference voltage $V_{REF}$ at the fifth period T5 in response to the +1-updated count value 41 h of the up/down counter 33 and supplies it to the non-inversion input terminal of the error amplifier 11 of the step-up DC-DC converter 10. Accordingly, the controller 12 of the DC-DC converter 10 operates so as to raise the level of the output DC voltage $V_{OUT}$ in response to the increased reference voltage $V_{REF}$.

As a result, since the eighth channel LED drive current $I_{LED<8>}$ made lower than the initial normal constant current value is raised and restored to the initial normal constant current value, the eighth abnormality detection determination signal LIMIT<8> changes from a high level to a low level.

Thus, the counter controller 32 writes a high level into a high-level eighth channel check end signal CHK_END<8> indicative of completion of the calibration operation for the output DC voltage $V_{OUT}$ related to the driver unit 28 for the eighth channel, in response to a state in which the low voltage find signal LOW_FIND is maintained at a high level, the pulse-width modulation scheme drive signal DPWMO<8> for the eighth channel is maintained at a high level, and the eighth channel abnormality detection determination signal LIMIT<8> is maintained at a low level.

That is, in order to reduce power consumption in the normal range of the channel LED drive current $I_{LED<8>}$ during a period in which the channel abnormality detection determination signal LIMIT<8> is not outputted, the reference voltage $V_{REF}$ is controlled low in such a manner that the value of the output DC voltage $V_{OUT}$ becomes low. In order to bring the reduced brightness of LED to a normal state during a period in which the channel abnormality detection determination signal LIMIT<8> is outputted, the reference voltage $V_{REF}$ is controlled significantly to control the value of the output DC voltage $V_{OUT}$ high, thus resulting in the ability to raise the value of the channel LED drive current $I_{LED<8>}$ and bring it to the normal constant current value.

FIG. 4 is a diagram showing the manner in which when a predetermined time elapses during drive operations of D11 through D16, . . . , and D81 through D86 of the white LED array by the semiconductor integrated circuit 1 according to the first embodiment of the present invention shown in FIG. 2, the calibration operation for the output DC voltage $V_{OUT}$ shown in FIG. 3 is executed on a regular basis.

During the drive operations Norm_Op of D11 through D16, . . . , and D81 through D86 of the white LED array in a predetermine time as shown in FIG. 4, the calibration operation Cal_OP for the step-up output DC voltage $V_{OUT}$ is regularly executed. During the calibration operation Cal_OP for the step-up output DC voltage $V_{OUT}$, a voltage adjustment Vadj on the step-up output DC voltage $V_{OUT}$ is executed so that output voltages $V_{-OUT1}$ through $V_{-OUT8}$ of the output terminals OUT1 through OUT8 of the driver units 21 through 28 for the eight channels in the constant current driver 20 of the semiconductor integrated circuit 1 are variably controlled.

Further, it is understood as shown in FIG. 4 that when the temperature $T_{CH}$ of a semiconductor chip for the semiconductor integrated circuit 1 changes from a low temperature to a high temperature during the drive operations Norm_OP of D11 through D16, . . . , and D81 through D86 of the white LED array, the step-up output DC voltage $V_{OUT}$ and the output voltages $V_{-OUT1}$ through $V_{-OUT8}$ are automatically adjusted to a low voltage level by the calibration operation Cal_OP executed after the change thereof to the high temperature.

Second Embodiment

<<Calibration Operation for Step-Up Output DC Voltage>>

FIG. 5 is a diagram showing a processing flow of a calibration operation for an output DC voltage $V_{OUT}$ according to a second embodiment of the present invention, which is carried out in the semiconductor integrated circuit 1 of the present invention shown in FIG. 2.

At the first Step 500 of FIG. 5, the count value DATA_VREF<6:0> of the up/down counter 33 is set to a predetermined initial value 3 Fh, and the low voltage find signal LOW_FIND indicative of first finding of the minimum voltage of the output DC voltage $V_{OUT}$ is set to a low level. The step-up controller 12 of the DC-DC converter 10 sets the reference voltage $V_{REF}$ corresponding to the initial value to 1.875V.

At the next Step 501, the counter controller 32 reads approximately in parallel, the levels of the abnormality detection determination signal LIMIT<1> of the driver unit 21 through the abnormality detection determination signal LIMIT<8> of the driver unit 28 for the eight channels in total. Actually, the counter controller 32 reads the level of the abnormality detection determination signal LIMIT<1> of the driver unit 21 during the period of the first drive signal DPWMO<1> high in level and thereafter reads the level of the abnormality detection determination signal LIMIT<2> of the driver unit 22 during the subsequent period of the second drive signal DPWMO<2> high in level. Subsequently, in the same manner as described above, the counter controller 32 reads the level of the abnormality detection determination signal LIMIT<8> of the driver unit 28 during the period of the final eighth drive signal DPWMO<8> high in level.

At the next Step 502, the counter controller 32 checks for the voltage level of the low voltage find signal LOW_FIND indicative of the first finding of the minimum voltage in the output DC voltage $V_{OUT}$. When the low voltage find signal LOW_FIND is a low level "0", the counter controller 32 proceeds to Step 503. When the low voltage find signal LOW_ FIND is a high level "1", the counter controller 32 proceeds to Step 508.

At Step 503, the counter controller 32 checks for all levels of the abnormality detection determination signals LIMIT<1> through LIMIT<8> for the eight channels. When all thereof are of the low level "0" (no abnormality occurs), the counter controller 32 proceeds to −1 decrement process of Step 504. On the other hand, when any thereof is of the high level "1" (abnormality occurs), the counter controller 32 proceeds to a +increment process of Step 505. That is, when all are of the low level "0" (no abnormality occurs), the value of the count value DATA_VREF<6:0> of the up/down counter 33 is decremented by −1 to reduce the output DC voltage $V_{OUT}$ because the output DC voltage $V_{OUT}$ has a margin. On the other hand, when any thereof is of the high level "1" (abnormality occurs), the value of the count value DATA_ VREF<6:0> of the up/down counter 33 is incremented by +1 to increase the output DC voltage $V_{OUT}$ because of the shortage of the output DC voltage $V_{OUT}$.

In the −1 decrement process of Step 504, the up/down counter 33 decrements a 7-bit count value by −1 in response to one down signal DOWN supplied from the counter controller 32.

In the +1 increment process of Step 505, the up/down counter 33 increments the 7-bit count value by +1 in response to one up signal UP supplied from the counter controller 32.

Further, at Step 506 executed after Step 505, the counter controller 32 changes the low voltage find signal LOW_FIND indicative of first finding of the minimum voltage of the output DC voltage $V_{OUT}$ from a low level to a high level.

Furthermore, at Step 507 executed after the −1 decrement process of Step 504 or Step 506, the reference voltage generation D/A converter 50 generates a reference voltage $V_{REF}$ in response to the +1-incremented or −1-incremented count value stored in the up/down counter 33. Incidentally, a tentative transient time is required to complete a change in the level of the output DC voltage $V_{OUT}$ by the operation of the controller 12 of the DC-DC converter 10 in response to the updated count value of the up/down counter 33.

After the output DC voltage $V_{OUT}$ having the updated voltage level at Step 507, the processing is returned to the first Step 501. Therefore, after the counter controller 32 has read again the abnormality detection determination signals LIMIT<1> through LIMIT<8> for the eight channels, the counter controller 32 checks again for the voltage level of the low voltage find signal LOW_FIND indicative of the first finding of the minimum voltage of the output DC voltage $V_{OUT}$.

At this Step 502, the low voltage find signal LOW_FIND has been changed from the low to high levels at the previous Step 506. The low voltage find signal LOW_FIND is therefore determined to be of the high level "1", and the processing proceeds to the next Step 508.

At Step 508, the counter controller 32 rechecks for all levels of the abnormality detection determination signals LIMIT<1> through LIMIT<8> for the eight channels. When all are of the low level "0" (no abnormality occurs) as a natural result of the recheck of Step 508, the counter controller 32 proceeds to Step 510. On the other hand, when any of them is of the high level "1" (the abnormality occurs) as an unexpected result of the recheck of Step 508, the counter controller 32 proceeds to a +1 increment process of Step 509.

At Step 510, the counter controller 32 verifies whether the high level "1" has been written into all channel check end signals CHK_END<1> through CHK_END<8> for the eight channels. When the result of verification is "negative", the processing is returned to the first Step 501. When the result of verification is "affirmative", the counter controller 32 sets the final set values of the count value DATA_VREF<6:0> of the up/down counter 33 at the calibration operation of the output DC voltage $V_{OUT}$ at Step 511. The major portion of the final set values of the count value DATA_VREF<6:0> set at Step 511 is the count value after the +1 increment process at Step 505, and the exceptional portion thereof is the count value after the +1 increment process at Step 509.

After the final setting process of the count value DATA_ VREF<6:0> at Step 511, the reference voltage generation D/A converter 50 generates a reference voltage $V_{REF}$ corresponding to the final set count value at Step 512. Further, at Step 512, the controller 12 of the DC-DC converter 10 is operated to set the level of the output DC voltage $V_{OUT}$ using this reference voltage $V_{REF}$. Furthermore, at Step 512, the output terminals OUT1 through OUT8 of the driver units 21 through 28 for the eight channels in the constant current driver 20 are used to drive plural cathodes of the bottom-stage LED devices D16 through D86 for the eight channels in a state in which the output DC voltage $V_{OUT}$ has been supplied to plural anodes of the top-stage LED devices D11 through D81 for the eight channels. As a result, the first channel LED drive current $I_{LED<1>}$ through the eighth channel LED drive current $I_{LED<8>}$ each having the normal constant current value flow into the white LED array. Therefore, all the LED devices D11 through D16, . . . , and D81 through D86 included in the white LED array can all be set to the normal light emitting brightness. The LED devices D11 through D16, . . . , and D81 through D86 included in the white LED array at Step 512 are dispersively driven by a plurality of dimming pulse-width modulation scheme drive signals DPWMO<1> through DPWMO<8> exactly in the same manner as in the first embodiment of the present invention.

When a predetermined time elapses at Step 513 during the drive operations of the LED devices D11 through D16, . . . , and D81 through D86 of the white LED array at Step 512, the processing proceeds to Step 514 to execute the calibration operation of the output DC voltage $V_{OUT}$ regularly. At Step 514, the counter controller 32 clears the channel check end signals CHK_END<1> through CHK_END<8> for the eight channels and the low voltage find signal LOW_FIND to the low level. Since the processing is returned to the first Step

5501 after the process of Step 514, the calibration operation for the output DC voltage $V_{OUT}$ is started again.

The processing flow of the calibration operation for the output DC voltage $V_{OUT}$ by the second embodiment of the present invention described in FIG. 5 realizes the setting of a minimum power consumption condition for the normal operation of all channels by the +1 increment of the count value at Step 505 where at Steps 502, 503, 504 and 507, the output DC voltage $V_{OUT}$ is sequentially reduced as long as all the channels are normal and thereafter the abnormality is detected even with respect to one channel at Step 503. In the processing flow of the calibration operation of FIG. 5, when the unexpected result that the abnormality occurs at Step 508 takes place after the setting of the minimum power consumption condition for the normal operation of all channels, the re-setting of the minimum power consumption condition for the normal operation of all channels is realized by an additional +1 increment of the count value at Step 509.

Third Embodiment

<<Configuration of Semiconductor Integrated Circuit According to the Third Embodiment>>

FIG. 6 is a diagram illustrating a configuration of a semiconductor integrated circuit for controlling and driving a white LED array, according to the third embodiment of the present invention.

The semiconductor integrated circuit 1 according to the third embodiment of the present invention shown in FIG. 6 is different in the following points from the semiconductor integrated circuit 1 according to the first embodiment of the present invention shown in FIG. 2.

That is, an inversion input terminal and a non-inversion input terminal of an abnormality detection comparator 213 of a driver unit 21 of a constant current driver 20 in the semiconductor integrated circuit 1 according to the third embodiment of the present invention shown in FIG. 6 are respectively supplied with a voltage (voltage at a constant current set terminal SO1 of the driver unit 21) at a source terminal of an N channel MOS transistor 212, and an abnormality detection criterion voltage $V_{LIM}$. Incidentally, the level of the abnormality detection criterion voltage $V_{LIM}$ is set to, for example, a voltage level equal to approximately ½ of a reference voltage Vref. Driver units 22 (not shown) through 28 for other channels provided inside the constant current driver 20 are also configured exactly in the same manner as the driver unit 21.

That is, even in the semiconductor integrated circuit 1 according to the third embodiment of the present invention shown in FIG. 6, the values of first channel LED drive current $I_{LED<1>}$ through eighth channel LED drive current $I_{LED<8>}$ are lowered more than an initial normal constant current value where the forward voltages $V_F$ of PN junctions of a plurality of LED devices D11 through D16, ..., and D81 through D86 extremely increase due to the causes of a significant drop in temperature and significant variations in the characteristics. Thus, a voltage drop developed across a constant current setting resistor Rs is reduced substantially more than the reference voltage Vref.

In such a case, in the semiconductor integrated circuit 1 according to the third embodiment of the present invention shown in FIG. 6, the voltage of the source terminal of the N channel MOS transistor 212 at the inversion input terminal of the abnormality detection comparator 213 of the driver unit 21 in the constant current driver 20 is reduced substantially more than the abnormality detection criterion voltage $V_{LIM}$ of the non-inversion input terminal. As a result, the abnormality detection comparator 213 generates a high-level abnormality detection determination signal LIMIT<1> and supplies it to a counter controller 32 of a logic unit 30. The driver units 22 through 28 for other channels provided inside the constant current driver 20 are also exactly similar to the driver unit 21, and their abnormality detection comparators respectively generate high-level abnormality detection determination signals LIMIT<2> through LIMIT<8> and supply the same to the counter controller 32 of the logic unit 30.

When any of the abnormality detection determination signals LIMIT<1> through LIMIT<8> is high in level, the counter controller 32 of the logic unit 30 generates one up signal UP and supplies it to an up/down counter 33. Therefore, the up/down counter 33 increments a 7-bit count value by +1 in response to one up signal UP. Thus, the reference voltage generation D/A converter 50 generates a reference voltage $V_{REF}$ more increased by a predetermined voltage than before in response to the +1-updated count value of the up/down counter 33 and supplies it to a non-inversion input terminal of an error amplifier 11 of a step-up DC-DC converter 10. Accordingly, a step-up controller 12 of the DC-DC converter 10 operates in response to the increased reference voltage $V_{REF}$ so that the level of an output DC voltage $V_{OUT}$ rises.

As described above, the semiconductor integrated circuit 1 according to the third embodiment of the present invention shown in FIG. 6 is capable of achieving an operation function similar to the semiconductor integrated circuit 1 according to the first embodiment of the present invention shown in FIG. 2.

Fourth Embodiment

<<Configuration of Semiconductor Integrated Circuit According to the Fourth Embodiment>>

Figure 7:
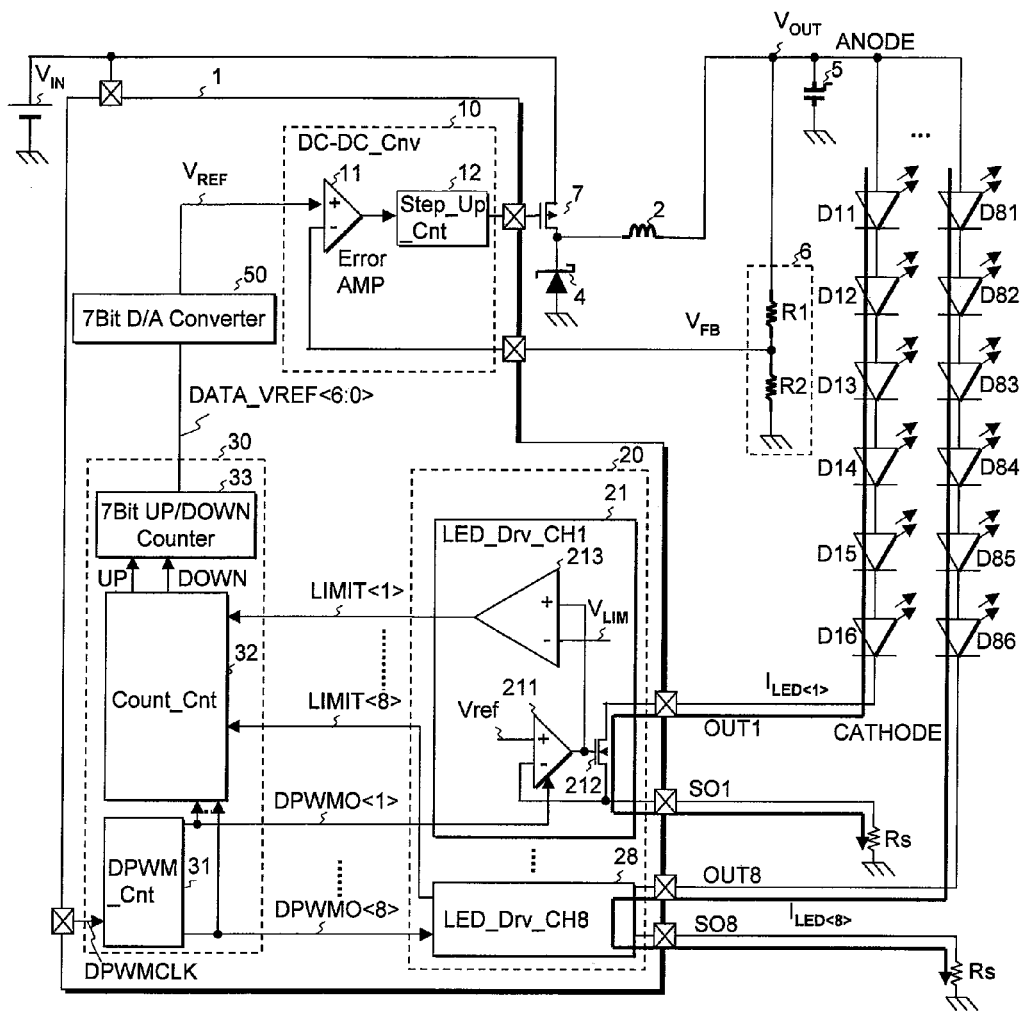
FIG. 7 is a diagram depicting a configuration of a semiconductor integrated circuit for controlling and driving a white LED array, according to a fourth embodiment of the present invention.

FIG. 7 is a diagram showing a configuration of a semiconductor integrated circuit for controlling and driving a white LED array, according to the fourth embodiment of the present invention.

The semiconductor integrated circuit 1 according to the fourth embodiment of the present invention shown in FIG. 7 is different in the following points from the semiconductor integrated circuit 1 according to the first embodiment of the present invention shown in FIG. 2.

That is, a P channel MOS transistor 7, a schottky diode 4, an inductor 2 and a smoothing capacitor 5 are coupled to a DC-DC converter 10 of the semiconductor integrated circuit 1 according to the fourth embodiment of the present invention shown in FIG. 7 in the form of coupling changed from FIG. 2. Thus, the DC-DC converter 10 is configured as a step-down DC-DC converter.

Thus, when an input DC voltage $V_{IN}$ shown in FIG. 7 is a relatively large voltage level, the step-down DC-DC converter 10 generates an output DC voltage $V_{OUT}$ having a voltage smaller than that of the input DC voltage $V_{IN}$.

That is, as shown in FIG. 7, the input DC voltage $V_{IN}$ is coupled to a source terminal of the P channel MOS transistor 7. A drain terminal of the P channel MOS transistor 7 is coupled to one end of the inductor 2 and a cathode of the schottky diode 4. An anode of the schottky diode 4 is coupled to a ground potential. The other end of the inductor 2 is coupled to a feedback circuit 6, a smoothing capacitor 5, and a plurality of anodes of top-stage LED devices D11 through D81 for eight channels.

Assuming that the inductance of the inductor 2 is L and the time is t, a current given by the following equation flows from the input DC voltage $V_{IN}$ to the output DC voltage $V_{OUT}$ through the power MOS transistor 7 and the inductor 2 during an on period of the P channel MOS transistor 7:

$$I_{ON}=(V_{IN}-V_{OUT})\cdot t/L \qquad (9)$$

During an off period of the power MOS transistor 7 after the on period thereof, a current given by the following equation flows from the ground potential to the output DC voltage $V_{OUT}$ through the rectifying diode 4 and the inductor 2:

$$I_{OFF}=V_{OUT}\cdot t/L \qquad (10)$$

Assuming that the on period of the power MOS transistor 7 is $T_{ON}$ and the off period of the power MOS transistor 7 is $T_{OFF}$, the current given by the equation (9) and the current given by the equation (10) should be made equal to each other at the boundary between both periods. Accordingly, the following equation is obtained:

$$(V_{IN}-V_{OUT})\cdot T_{ON}/L=V_{OUT}\cdot T_{OFF}/L \qquad (11)$$

Expanding the equation (11) yields the relationship of the following equation:

$$V_{OUT}=V_{IN}\cdot T_{ON}/(T_{ON}+T_{OFF}) \qquad (12)$$

This equation (12) shows that a switching regulator comprised of the step-up DC-DC converter 10, the inductor 2, the P channel power MOS transistor 7, the rectifying diode 4 and the smoothing capacitor 5 generates an output DC voltage $V_{OUT}$ having a voltage smaller than that of the input DC voltage $V_{IN}$.

On the other hand, a feedback voltage $V_{FB}$ obtained by division of the output DC voltage $V_{OUT}$ by division resistors R1 and R2 of the feedback circuit 6 is supplied to an inversion input terminal of an error amplifier 11, and a non-inversion input terminal of the error amplifier 11 is supplied with a reference voltage $V_{REF}$ generated from a reference voltage generation D/A converter 50. For this reason, the error amplifier 11 is operated in such a manner that the level of the feedback voltage $V_{FB}$ coincides with the level of the step-up reference voltage $V_{REF}$ to thereby generate an output DC voltage $V_{OUT}$. That is, a controller 12 determines the ratio between the on period $T_{ON}$ and the off period $T_{OFF}$ according to the ratio between a rising period of a pulse-width modulated (PWM) triangular waveform and a falling period thereof in such a manner that both voltage levels coincide with each other.

Fifth Embodiment

<<Configuration of Semiconductor Integrated Circuit According to the Fifth Embodiment>>

Figure 8:
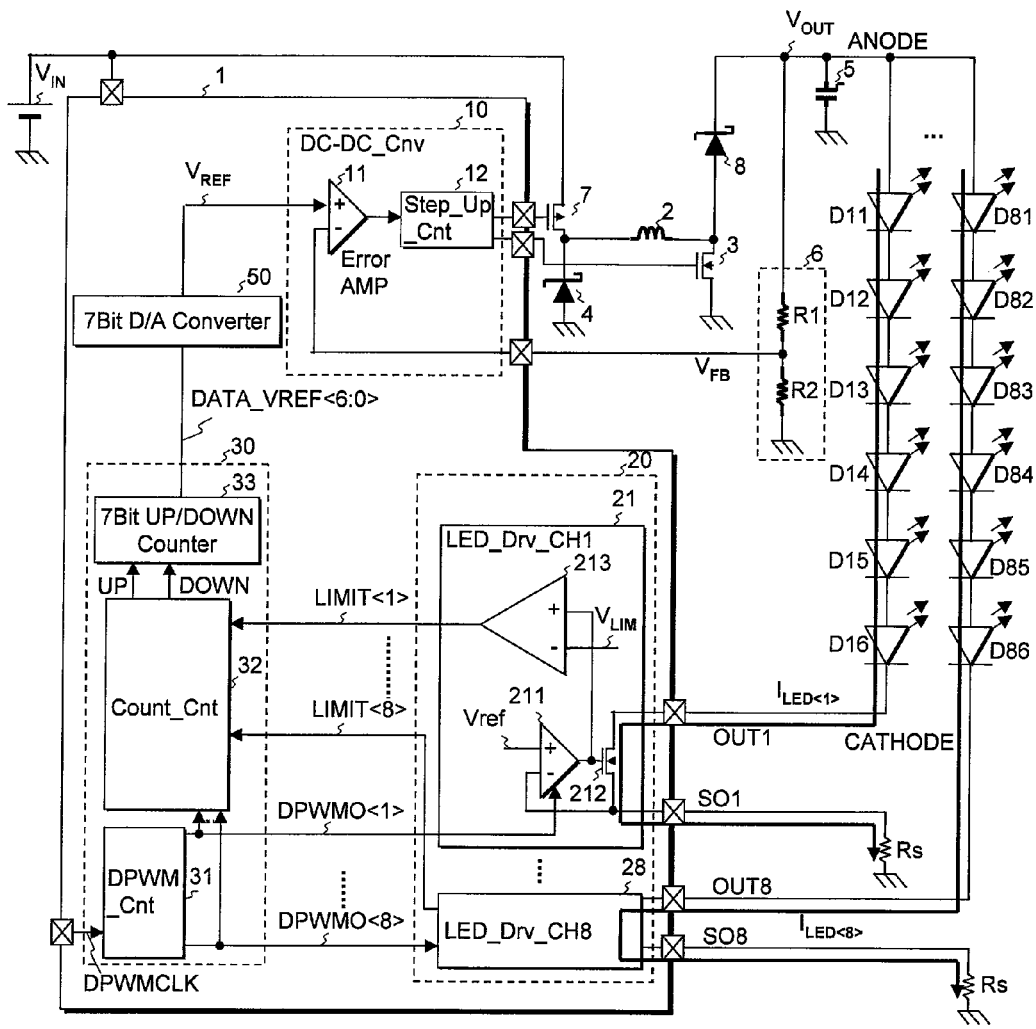
FIG. 8 is a diagram showing a configuration of a semiconductor integrated circuit for controlling and driving a white LED array, according to a fifth embodiment of the present invention.

FIG. 8 is a diagram showing a configuration of a semiconductor integrated circuit for controlling and driving a white LED array, according to the fifth embodiment of the present invention.

The semiconductor integrated circuit 1 according to the fifth embodiment of the present invention shown in FIG. 8 is different in the following points from the semiconductor integrated circuit 1 according to the fourth embodiment of the present invention shown in FIG. 7.

That is, an N channel power MOS transistor 3 and a schottky diode 8 are added to a switching regulator according to the fifth embodiment of the present invention shown in FIG. 8. Namely, a drain terminal of the power MOS transistor 3, i.e., the other terminal of the inductor 2 is coupled to a feedback circuit 6 and an anode of the schottky diode 8. A source terminal of the power MOS transistor 3 is coupled to a ground potential. A gate terminal of the power MOS transistor 3 is controlled by a controller 12 of a step-up/step-down DC-DC converter 10. A cathode of the schottky diode 8 is coupled to a smoothing capacitor 5 and a plurality of anodes of top-stage LED devices D11 through D81 for eight channels.

<<Step-Up Operation Mode>>

The switching regulator that uses the semiconductor integrated circuit 1 according to the fifth embodiment of the present invention shown in FIG. 8 controls a P channel MOS transistor 7 to a normally on state by the controller 12 of the step-up/step-down DC-DC converter 10 to thereby on/off-control the N channel power MOS transistor 3. Thus, the switching regulator is operated as a step-up DC-DC converter which generates an output DC voltage $V_{OUT}$ having a voltage larger than that of an input DC voltage $V_{IN}$ in a manner similar to the semiconductor integrated circuit 1 according to the first embodiment of the present invention shown in FIG. 2.

<<Step-Down Operation Mode>>

The switching regulator that uses the semiconductor integrated circuit 1 according to the fifth embodiment of the present invention shown in FIG. 8 controls the N channel power MOS transistor 3 to a normally off state by the controller 12 of the step-up/step-down DC-DC converter 10 to thereby on/off-control the P channel MOS transistor 7. Thus, the switching regulator is operated as a step-down DC-DC converter which generates an output DC voltage $V_{OUT}$ having a voltage smaller than that of the input DC voltage $V_{IN}$ in a manner similar to the semiconductor integrated circuit 1 according to the fourth embodiment of the present invention shown in FIG. 7.

While the invention made above by the present inventors has been described specifically on the basis of the various preferred embodiments, the present invention is not limited to the embodiments referred to above. It is needless to say that various changes can be made thereto within the scope not departing from the gist thereof.

In the above embodiment of the present invention, there is provided the system that the initial value of the count value of the up/down counter 33 is set to the input digital value approximately midway in the dynamic range for D/A conversion of the reference voltage generation D/A converter 50, and that the input digital value is sequentially reduced unless the abnormality is detected even in the case of one channel and when the abnormality is detected, the input digital value is incremented by +1 to set the count value of the up/down counter 33. The present invention is, however, not limited to this system. The present invention can be applied even to a system in which an input digital value is sequentially reduced unless an abnormality is detected even with respect to one channel, starting from the maximum value of a dynamic range or a high level thereof, and when the abnormality is detected, the input digital value is incremented by +1 to set the count value of the up/down counter 33, or a system in which an input digital value is sequentially increased until the normal state is detected over all channels, starting from the minimum value of a dynamic range or a low level thereof.

Further, the N channel MOS transistor 212 included in the driver unit 21 of the constant current driver 20 in the semiconductor integrated circuit 1 shown in each of FIGS. 2 and 6 can be replaced with an NPN bipolar transistor.

Furthermore, the present invention can also be applied to a tricolor LED system in which three systematic channels of a channel (string) for a red light emitting diode, a channel for a green light emitting diode and a channel for a blue light emitting diode are driven in parallel to achieve white light emission.

Still further, the present invention is also applicable to an organic EL light emitting device in which a voltage is applied to a cathode and an anode to inject electrons and positive holes therein respectively, the injected electrons and positive holes are respectively caused to pass through an electron transport layer and a positive-hole transport layer to combine them with a light emitting layer, thereby performing light emission.

What is claimed is:

1. A semiconductor integrated circuit capable of driving a plurality of channels of a light emitting device array in parallel, comprising:
a DC-DC converter;
a current driver;
a logic unit; and
a D/A converter,
wherein the DC-DC converter is capable of supplying an output DC voltage generated by stepping-up or stepping-down an input DC voltage to a plurality of one ends of the channels in common,
wherein the current driver comprises a plurality of driver units capable of driving a plurality of other ends of the channels,
wherein each of the driver units comprises a drive transistor which drives the other end of each of the channels of the light emitting array, and a detector capable of detecting an abnormality of a drive current of the drive transistor,
wherein the logic unit is capable of generating digital data in response to a plurality of detection signals generated from the detectors of the driver units of the current drive and supplying the same to an input terminal of the D/A converter,
wherein the D/A converter is capable of generating an analog voltage in response to the digital data and supplying the same to the DC-DC converter as a reference voltage, and
wherein the logic unit performs, according to sequential updating of the digital data, a calibration operation which determines the digital data for setting the minimum output DC voltage at a normal operation of all the channels, in which none of the detection signals generated from the detectors indicates the abnormality of the drive current.

2. The semiconductor integrated circuit according to claim 1,
wherein prior to execution of the calibration operation, the logic unit supplies the digital data set to a predetermined initial value to the input terminal of the D/A converter and thereafter the logic unit starts the execution of the calibration operation.

3. The semiconductor integrated circuit according to claim 2,
wherein when a predetermined time elapses during the operation of driving the channels of the light emitting array by the current driver, the logic unit performs the calibration operation on a regular basis.

4. The semiconductor integrated circuit according to claim 3,
wherein prior to the execution of the calibration operation, the logic unit supplies the digital data set to the predetermined initial value to the input terminal of the D/A converter, and thereafter each time the normal operation of all the channels is confirmed by the execution of the calibration operation, the logic unit sequentially resets the digital data to a value smaller than the predetermined initial value, and
wherein when the normal operation of all the channels is not confirmed by the subsequent execution of the calibration operation, the value of the digital data is restored to a value in a state in which the normal operation of all the channels has finally been confirmed.

5. The semiconductor integrated circuit according to claim 3,
wherein each of the driver units further comprises a differential amplifier having a non-inversion input terminal supplied with a reference voltage, an inversion input terminal to which a common terminal of the drive transistor is coupled, and an output terminal to which a control input terminal of the drive transistor is coupled,
wherein a constant current setting resistor is couplable between both the inversion input terminal of the differential amplifier of each of the driver units and the common terminal of the drive transistor, and a ground potential, and
wherein one of the control input terminal of the drive transistor and the common terminal is coupled to one input terminal of the detector of each of the driver units, and the other input terminal of the detector of each of the driver units is supplied with a detection criterion voltage.

6. The semiconductor integrated circuit according to claim 3,
wherein the logic unit comprises a counter which stores the value of the digital data therein, and a counter controller which sequentially updates the value of the digital data stored in the counter in response to the detection signals generated from the detectors.

7. The semiconductor integrated circuit according to claim 6,
wherein the logic unit further comprises a dimming controller which generates a plurality of dimming pulse-width modulation drive signals, and
wherein the driver units are activated by the dimming pulse-width modulation drive signals generated from the dimming controller.

8. The semiconductor integrated circuit according to claim 7,
wherein the dimming controller generates the dimming pulse-width modulation drive signals with mutually different generation timings by a distributed drive system.

9. The semiconductor integrated circuit according to claim 8,
wherein an inductor, a power MOS transistor and a smoothing capacitor are couplable to the DC-DC converter outside the semiconductor integrated circuit, and
wherein the DC-DC converter repeatedly drives the power MOS transistor during an on period and an off period to thereby generate the output DC voltage.

10. The semiconductor integrated circuit according to claim 9,
wherein the driver units of the current driver are capable of driving the channels of the light emitting device array comprising a plurality of light emitting diodes having PN junctions.

11. An operation method of a semiconductor integrated circuit capable of driving a plurality of channels of a light emitting device array in parallel, comprising the steps of:
causing the semiconductor integrated circuit to comprise a DC-DC converter, a current driver, a logic unit, and a D/A converter;
causing the DC-DC converter to be capable of supplying an output DC voltage generated by stepping-up or stepping-down an input DC voltage to a plurality of one ends of the channels in common;
causing the current driver to comprise a plurality of driver units capable of driving a plurality of other ends of the channels;

causing each of the driver units to comprise a drive transistor which drives the other end of each of the channels of the light emitting array, and a detector capable of detecting an abnormality of a drive current of the drive transistor;

causing the logic unit to be capable of generating digital data in response to a plurality of detection signals generated from the detectors of the driver units of the current driver and supplying the same to an input terminal of the D/A converter;

causing the D/A converter to be capable of generating an analog voltage in response to the digital data and supplying the same to the DC-DC converter as a reference voltage; and causing the logic unit to perform, according to sequential updating of the digital data, a calibration operation which determines the digital data for setting the minimum output DC voltage at a normal operation of all the channels, in which none of the detection signals generated from the detectors indicates the abnormality of the drive current.

12. The operation method according to claim 11, comprising the steps of causing the logic unit to supply the digital data set to a predetermined initial value to the input terminal of the D/A converter prior to execution of the calibration operation, and after the step above, causing the logic unit to start the execution of the calibration operation.

13. The operation method according to claim 12, comprising the step of causing the logic unit to perform the calibration operation on a regular basis when a predetermined time elapses during the operation of driving the channels of the light emitting array by the current driver.

14. The operation method according to claim 13, comprising the steps of:

causing the logic unit to supply the digital data set to the predetermined initial value to the input terminal of the D/A converter prior to the execution of the calibration operation, and after the step above, causing the logic unit to sequentially reset the digital data to a value smaller than the predetermined initial value each time the normal operation of all the channels is confirmed by the execution of the calibration operation; and when the normal operation of all the channels is not confirmed by the subsequent execution of the calibration operation, causing the value of the digital data to be restored to a value in a state in which the normal operation of all the channels has finally been confirmed.

15. The operation method according to claim 13, comprising the steps of:

causing each of the driver units to further comprise a differential amplifier having a non-inversion input terminal supplied with a reference voltage, an inversion input terminal to which a common terminal of the drive transistor is coupled, and an output terminal to which a control input terminal of the drive transistor is coupled;

causing a constant current setting resistor to be coupled between both the inversion input terminal of the differential amplifier of each of the driver units and the common terminal of the drive transistor, and a ground potential; and causing one of the control input terminal of the drive transistor and the common terminal to be coupled to one input terminal of the detector of each of the driver units, and supplying a detection criterion voltage to the other input terminal of the detector of each of the driver units.

16. The operation method according claim 13, comprising the step of causing the logic unit to comprise a counter which stores the value of the digital data therein, and a counter controller which sequentially updates the value of the digital data stored in the counter in response to the detection signals generated from the detectors.

17. The operation method according to claim 16, comprising the steps of:

causing the logic unit to further comprise a dimming controller which generates a plurality of dimming pulse-width modulation drive signals; and causing the driver units to be activated by the dimming pulse-width modulation drive signals generated from the dimming controller.

18. The operation method according to claim 17, comprising the step of causing the dimming controller to generate the dimming pulse-width modulation drive signals with mutually different generation timings by a distributed drive system.

19. The operation method according to claim 18, comprising the steps of:

causing an inductor, a power MOS transistor and a smoothing capacitor to be couplable to the DC-DC converter outside the semiconductor integrated circuit; and causing the DC-DC converter to repeatedly drive the power MOS transistor during an on period and an off period to thereby generate the output DC voltage.

20. The operation method according to claim 19, comprising the step of causing the driver units of the current driver to be capable of driving the channels of the light emitting device array including a plurality of light emitting diodes having PN junctions.

* * * * *